(12) United States Patent
Kim et al.

(10) Patent No.: US 10,657,928 B2
(45) Date of Patent: May 19, 2020

(54) PROJECTED CONTENT BASED DISPLAY DEVICE AND DISPLAY METHOD

(71) Applicant: SONY CORPORATION, Tokyo (JP)

(72) Inventors: Heesoon Kim, Tokyo (JP); Tatsushi Nashida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 14/535,543

(22) Filed: Nov. 7, 2014

(65) Prior Publication Data

US 2015/0138239 A1 May 21, 2015

(30) Foreign Application Priority Data

Nov. 19, 2013 (JP) .................. 2013-238693

(51) Int. Cl.
| | |
|---|---|
| *G09G 5/00* | (2006.01) |
| *G09G 5/377* | (2006.01) |
| *G03B 21/00* | (2006.01) |
| *G06F 3/14* | (2006.01) |
| *H04N 9/31* | (2006.01) |
| *H04N 9/73* | (2006.01) |
| *G03B 29/00* | (2006.01) |
| *H04N 5/74* | (2006.01) |
| *H04N 21/41* | (2011.01) |

(52) U.S. Cl.
CPC ............ *G09G 5/377* (2013.01); *G03B 21/00* (2013.01); *G03B 29/00* (2013.01); *G06F 3/1446* (2013.01); *H04N 9/3147* (2013.01); *H04N 9/3185* (2013.01); *H04N 9/73* (2013.01); *G06F 3/1423* (2013.01); *G09G 2320/10* (2013.01); *G09G 2340/10* (2013.01); *G09G 2340/14* (2013.01); *G09G 2340/145* (2013.01); *G09G 2356/00* (2013.01); *G09G 2360/04* (2013.01); *H04N 5/74* (2013.01); *H04N 9/31* (2013.01); *H04N 21/4122* (2013.01)

(58) Field of Classification Search
CPC .......... G06F 3/0484; G06F 3/14; H04M 1/02
USPC .......................................................... 345/1.3
See application file for complete search history.

(56) References Cited

U.S. PATENT DOCUMENTS

| | | | |
|---|---|---|---|
| 8,726,165 B1 * | 5/2014 | Phillips | 715/739 |
| 2003/0159153 A1 * | 8/2003 | Falvo | H04N 7/163 725/110 |
| 2003/0218577 A1 * | 11/2003 | Wang | G06F 1/1616 345/1.3 |
| 2006/0172767 A1 | 8/2006 | Cathey, Jr. et al. | |

(Continued)

FOREIGN PATENT DOCUMENTS

| | | |
|---|---|---|
| EP | 04817659.8 A1 | 10/2006 |
| EP | 2129084 A1 | 12/2009 |
| JP | 2012-034127 A | 2/2012 |

OTHER PUBLICATIONS

Extended European Search Report dated May 6, 2015 in patent application No. 14191534.8.

(Continued)

*Primary Examiner* — Weiming He
(74) *Attorney, Agent, or Firm* — Chip Law Group

(57) ABSTRACT

There is provided a display device including a display unit, and a projection unit provided in a direction intersecting with a direction perpendicular to a display surface of the display unit, with a rear side of the display surface as a projection direction.

19 Claims, 28 Drawing Sheets

(56) References Cited

U.S. PATENT DOCUMENTS

| | | | |
|---|---|---|---|
| 2006/0244339 A1 | 11/2006 | Mazz et al. | |
| 2006/0291800 A1* | 12/2006 | Uehara | H04N 5/782 |
| | | | 386/282 |
| 2007/0275752 A1 | 11/2007 | Noba | |
| 2009/0279847 A1* | 11/2009 | Kinoshita | H04N 5/44543 |
| | | | 386/291 |
| 2009/0298547 A1* | 12/2009 | Kim | G06F 1/162 |
| | | | 455/566 |
| 2010/0210312 A1 | 8/2010 | Kim et al. | |
| 2012/0038542 A1* | 2/2012 | Miyashita | G06F 1/1626 |
| | | | 345/7 |
| 2012/0038552 A1 | 2/2012 | Panchal et al. | |
| 2012/0209962 A1* | 8/2012 | Eyal | G06F 17/30038 |
| | | | 709/219 |
| 2012/0214546 A1 | 8/2012 | Osaka | |
| 2012/0309522 A1* | 12/2012 | Westlund | A63F 13/10 |
| | | | 463/31 |
| 2013/0067035 A1* | 3/2013 | Amanat | G06Q 30/02 |
| | | | 709/219 |
| 2013/0086512 A1 | 4/2013 | Rasmussen | |
| 2013/0321244 A1* | 12/2013 | Ono | G09F 9/301 |
| | | | 345/1.3 |
| 2014/0019874 A1* | 1/2014 | Li | H04L 67/06 |
| | | | 715/748 |
| 2014/0145988 A1* | 5/2014 | Ishizawa | H04L 67/06 |
| | | | 345/173 |

OTHER PUBLICATIONS

Office Action for JP Patent Application No. 2013-238693, dated Nov. 1, 2016, 05 pages.

\* cited by examiner

PROJECTED CONTENT BASED DISPLAY DEVICE AND DISPLAY METHOD

CROSS REFERENCE TO RELATED APPLICATIONS

This application claims the benefit of Japanese Priority Patent Application JP 2013-238693 filed Nov. 19, 2013, the entire contents of which are incorporated herein by reference.

BACKGROUND

The present disclosure relates to a display device, a display method, and a program.

Recently, products and software have been developed which display images on a plurality of display devices and combine the respective displayed image to thereby perform one display as a whole. For example, "IllumiRoom Projects Images Beyond Your TV for an Immersive Gaming Experience", Internet (URL: http://www.youtube.com/watch?v=relEatGRV0w) discloses a product that projects a surrounding image of an image to be displayed on a display device, such as a liquid crystal display, around a display surface of the display device by a projector installed in front of the display device.

SUMMARY

However, in the product disclosed in "IllumiRoom Projects Images Beyond Your TV for an Immersive Gaming Experience", Internet (URL: http://www.youtube.com/watch?v=relEatGRV0w), since the projector is installed in front of the display, when a person crosses between the display and the projector, the projection of the projector is blocked and thus the projected image may be invisible. Therefore, the present disclosure proposes a display device, a display method, and a program, which are new and improved, capable of preventing a projection of a projection unit from being blocked by an object located in front of the display unit.

According to an embodiment of the present disclosure, there is provided a display device including a display unit, and a projection unit provided in a direction intersecting with a direction perpendicular to a display surface of the display unit, with a rear side of the display surface as a projection direction.

According to another embodiment of the present disclosure, there is provided a display method including displaying an image, and projecting an image in a direction intersecting with a direction perpendicular to a display surface of the image on a rear side of the display surface.

According to another embodiment of the present disclosure, there is provided a program for causing a computer to execute the processing of displaying an image, and projecting an image in a direction intersecting with a direction perpendicular to a display surface of the image on a rear side of the display surface.

According to the present disclosure described above, there are provided a display device, a display method, and a program, capable of preventing a projection of a projection unit from being blocked by an object located in front of the display unit. Note that the above effects are not necessarily limited thereto. In addition to or alternative to the above effects, any one of effects that are set forth in the present specification or other effect that can be grasped from the present specification may be achieved.

DETAILED DESCRIPTION OF THE EMBODIMENT(S)

Figure 1:
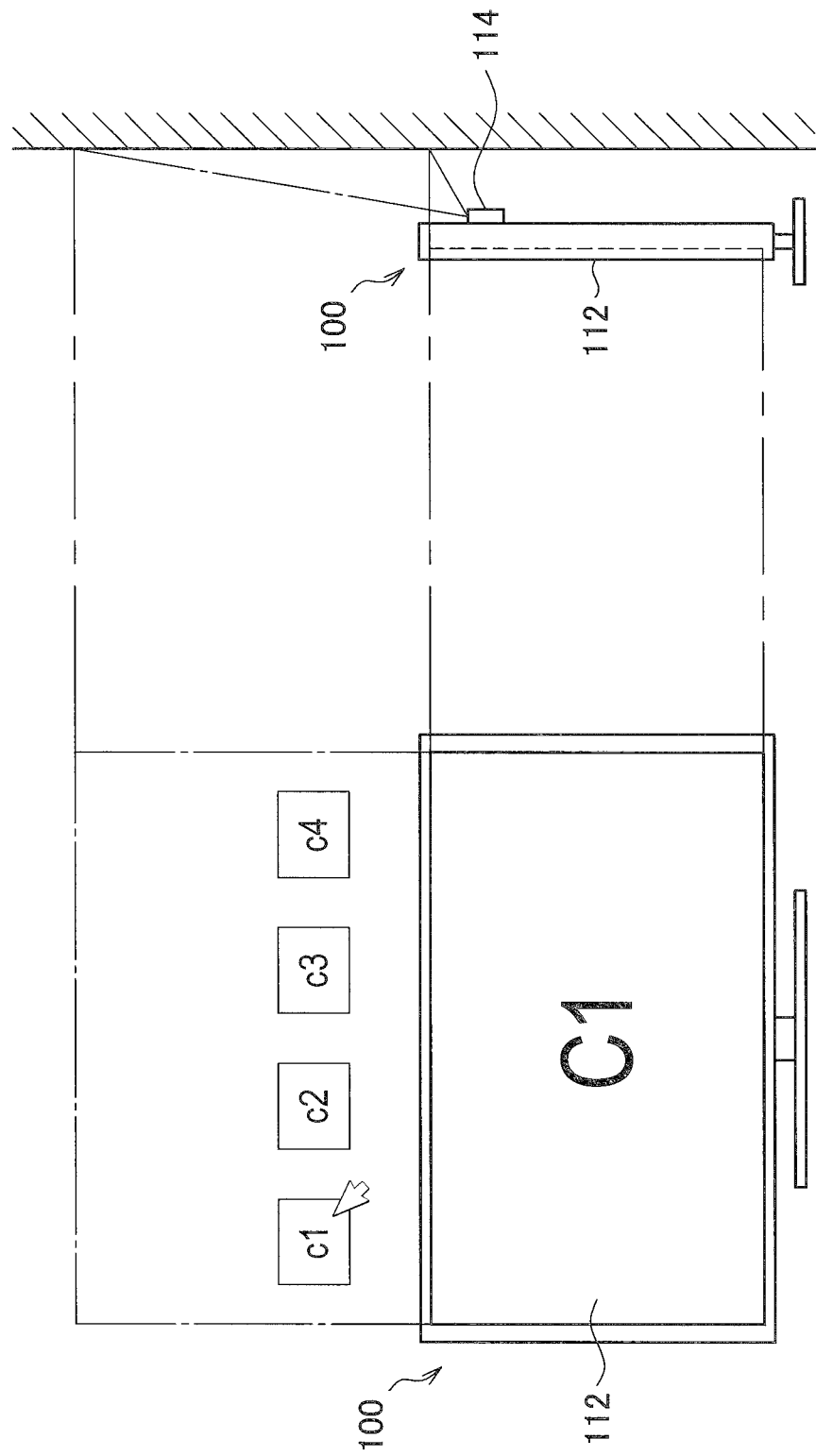
FIG. 1 is a diagram describing an overview of a display device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Overview of display device according to embodiment of the present disclosure
2. First embodiment of the present disclosure
2-1. Configuration of display device according to first embodiment of the present disclosure
2-2. Processing of display device in first embodiment of the present disclosure
2-3. Modification of first embodiment of the present disclosure
3. Second embodiment of the present disclosure
3-1. Configuration of display device according to second embodiment of the present disclosure
3-2. Processing of display device in second embodiment of the present disclosure
3-3. Modification of second embodiment of the present disclosure
4. Third embodiment of the present disclosure
4-1. Configuration of display device according to third embodiment
4-2. Processing of display device in third embodiment
4-3. Modification of third embodiment of the present disclosure
5. Fourth embodiment of the present disclosure
5-1. Configuration of display device according to fourth embodiment of the present disclosure
5-2. Processing of display device in fourth embodiment of the present disclosure
5-3. Modification of fourth embodiment of the present disclosure
6. Hardware configuration according to embodiment of the present disclosure
7. Conclusion

1. Overview of Display Device According to Embodiment of the Present Disclosure First, an overview of a display device according to an embodiment of the present disclosure will be described with reference to FIG. 1. FIG. 1 is a diagram describing an overview of a display device according to an embodiment of the present disclosure. A left diagram of FIG. 1 is a front view of a display device 100 and a right diagram of FIG. 1 is a side view of the display device 100.

The display device 100 illustrated in FIG. 1 is a stationary display device including a display unit 112 and a projection unit 114. The display device 100 displays content on the display unit 112 and projects content on the projection unit 114. Therefore, the display device 100 can display and project different contents, respectively, on the display unit 112 and the projection unit 114. Furthermore, the display device 100 projects a GUI, which operates the display of the display unit 112, on the projection unit 114. Therefore, a user can operate the display of the display unit 112 with an eye to the display of the display unit 112.

For example, as illustrated in the left diagram of FIG. 1, the display device 100 can project GUIs on the projection unit 114 at an upper rear side of a display surface of the display unit 112, while displaying a video on the display unit 112. When the user selects c1 from the projected GUIs by a cursor, the display device 100 can display a video C1 on the display unit 112. When the projection unit 114 is disposed in front of the display surface of the display unit 112, the projection of the projection unit 114 may be blocked by an object located between the projection unit 114 and the display device 100. Thus, in the display device 100, the projection unit 114, in which the rear of the display surface is set as a projection direction, is provided at a position opposite to the display surface of the display unit 112, in a direction intersecting with a direction perpendicular to the display surface of the display unit 112.

As described above, the display device 100 includes the display unit 112, and the projection unit 114 which is provided at a position opposite to the display surface of the display unit 112, with the rear of the display surface as a projection direction, in a direction intersecting with a direction perpendicular to the display surface of the display unit 112. Therefore, it is possible to perform the projection, without projection light being blocked by an object located in front of the display device 100, and to appear to the user viewing the display of the display unit 112 as if the projection screen is adjacent to the display unit 112.

2. First Embodiment of the Present Disclosure

[2-1. Configuration of Display Device According to First Embodiment of the Present Disclosure]

Figure 2:
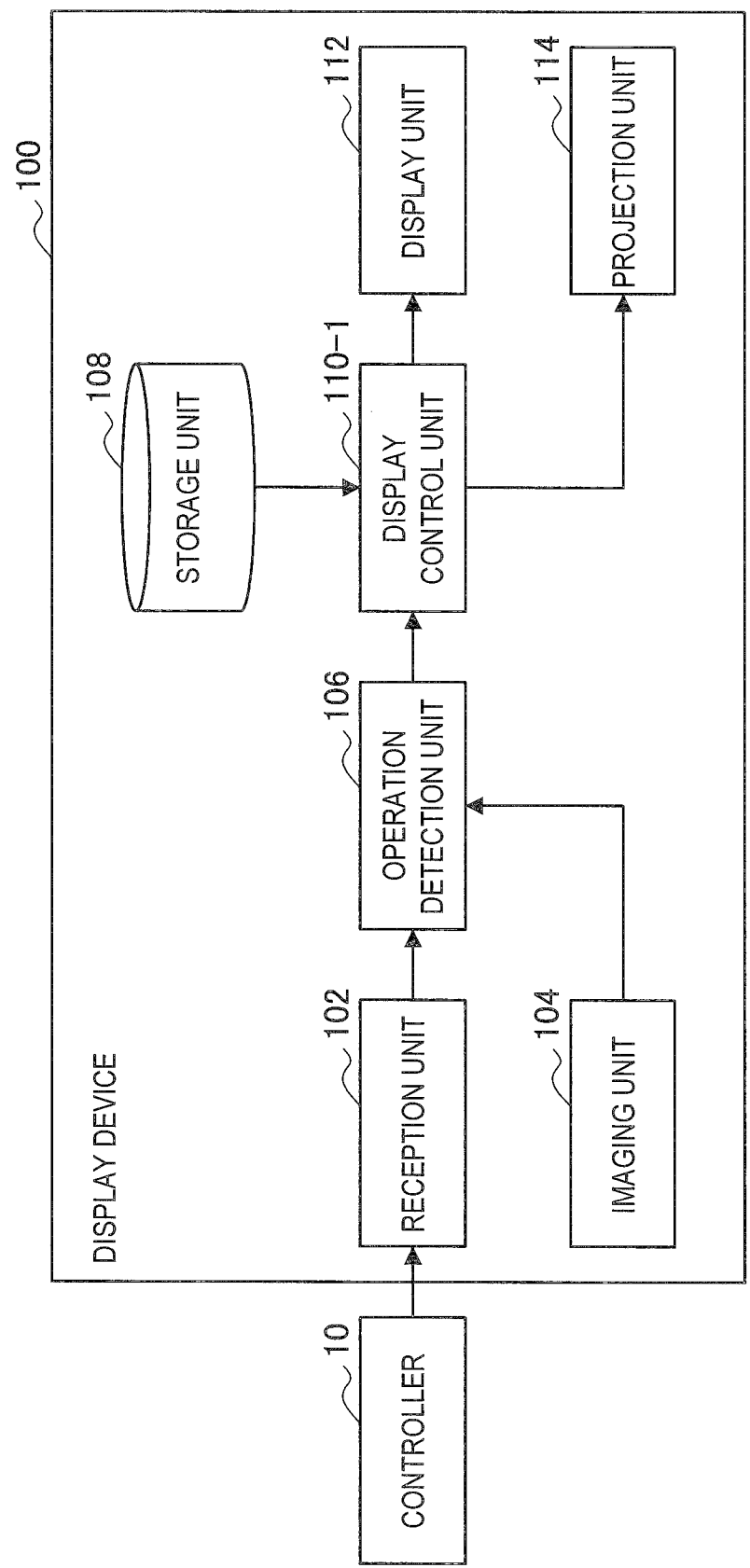
FIG. 2 is a block diagram illustrating a schematic functional configuration of a display device in a first embodiment of the present disclosure.

So far, the overview of the display device 100 according to the embodiment of the present disclosure has been described. Next, a configuration of a display device 100 according to a first embodiment of the present disclosure will be described with reference to FIG. 2. FIG. 2 is a block diagram illustrating a schematic functional configuration of a display device 100 according to a first embodiment of the present disclosure. Note that, for convenience of description, display control units 110 of first to fourth embodiments are distinguished from one another by assigning numbers corresponding to the embodiments at the ends, like a display control unit 110-1 to a display control unit 110-4.

As illustrated in FIG. 2, the display device 100 includes a reception unit 102, an imaging unit 104, an operation detection unit 106, a storage unit 108, a display control unit 110-1, a display unit 112, and a projection unit 114.

The reception unit 102 receives information transmitted from a controller 10. The controller 10 is a device configured to operate the display device 100. Specifically, the controller 10 transmits operation information of the display device 100, and the reception unit 102 receives the operation information transmitted from the controller 10. For example, the controller 10 may be a pointing device or the like. Also, as communication means, for example, infrared communication, Bluetooth (registered trademark) communication, WiFi (registered trademark) communication, or the like may be used. The imaging unit 104 captures the surrounding of the display device 100. For example, the imaging unit 104 may capture a predetermined angle range in front of the display device 100, or may capture a plurality of different angle ranges.

The operation detection unit 106 detects an operation of a user, based on operation information acquired from the reception unit 102 or an image acquired from the imaging unit 104. Specifically, the operation detection unit 106 detects an operation on the display device 100 by analyzing operation information indicating an actual action of a user or an image acquired by capture. For example, the operation information acquired from the reception unit 102 is information on a trajectory of a pointer, a pressing of a button, and the like, and the operation detection unit 106 may grasp a position on a screen from the trajectory of the pointer and grasp a selection operation from the pressing of the button. The operation detection unit 106 may detect that a screen operation corresponding to the selection operation at the grasped position, for example, a content change operation, has been performed. Also, for example, the operation detection unit 106 may perform face recognition processing on the image acquired from the imaging unit 104 and detect an operation to be performed based on the recognized face information.

The storage unit 108 stores content and information associated with the content. For example, the content may be a video, an image, a sound. Instead of the storage unit 108, an acquisition unit that acquires content from an external device or a communication unit that acquires content through a wired communication or a wireless communication may be provided.

Figure 3:
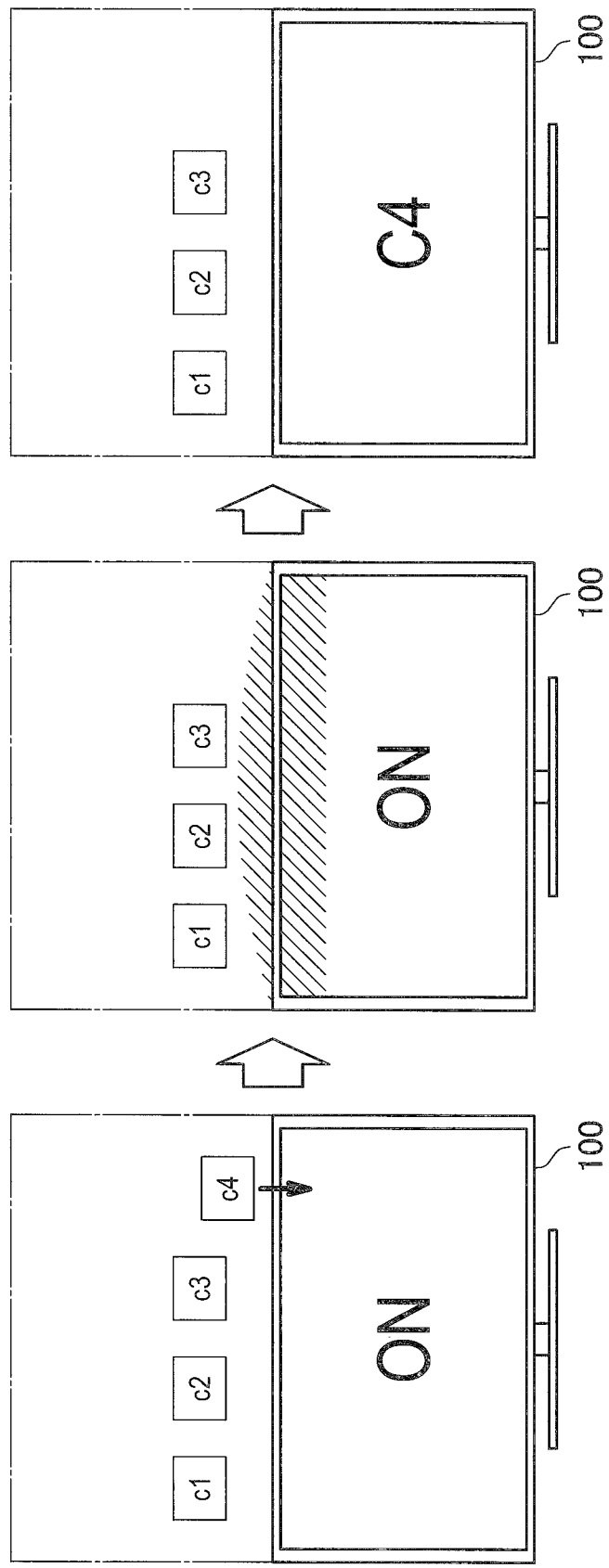
FIG. 3 is a diagram illustrating a change in each of a display image and a projection image of a display device in the first embodiment of the present disclosure.

The display control unit 110-1 controls the display unit 112 and the projection unit 114. Specifically, the display image of the display unit 112 and the projection image of the projection unit 114 are changed to interwork with each other, based on the detection result of the operation detection unit 106. For example, when the selection operation in the projection image is detected by the operation detection unit 106, the display control unit 110-1 erases a portion of the projection image associated with the selection operation from the projection image, while shifting in a direction toward the display unit. After giving an effect to an adjacent region of each of the display image and the projection image, the display control unit 110-1 switches the display of the display unit 112 to content associated with the selection operation. Furthermore, details will be described with reference to FIG. 3. FIG. 3 is a diagram illustrating a change in each of a display image and a projection image of the display device 100 according to the first embodiment of the present disclosure.

First, the display control unit 110-1 displays content on the display unit 112 and projects content on the projection unit 114. For example, as illustrated in the left diagram of FIG. 3, the display control unit 110-1 may display a video on the display unit 112 and project images c1 to c4, which are GUIs associated with the video displayed on the display unit 112, on the projection unit 114 at the upper rear side of the display surface of the display unit 112. The GUIs may be an electronic program guide (EPG). Then, the display control unit 110-1 changes the projection image, based on an operation detected by the operation detection unit 106, such that the projected content is erased by shifting in a direction toward the display unit 112. For example, as illustrated in the left diagram of FIG. 3, the display control unit 110-1 may erase the projected image c4 from the projection image by shifting in a direction toward the display unit 112.

Then, the display control unit 110-1 gives an effect to an adjacent region of each of the projection image and the display image. For example, as illustrated in the middle diagram of FIG. 3, after the image c4 is erased from the projection image, the display control unit 110-1 may simultaneously give an effect to a lower portion of the projection image and an upper rear side of the display image on the display surface. For example, the effect may be a color change, such as hue, saturation, or brightness, a partial change in a shape of an image, or a superimposed display of an additional image.

Note that the effect may be given in the order of the projection image and the display image. This enables the user to intuitively understand that the display image has been changed based on the change in the projection image. Also, note that the effect may be given to only a portion of the adjacent region of the projection image and the display image. For example, the display control unit 110-1 may give an effect to only a portion superimposed with a trajectory of the image c4 in the adjacent region of the projection image and the display image. Therefore, the user can intuitively understand that the display image has been changed based on the region where the projection image has been changed. Then, the display control unit 110-1 switches the display of the display unit 112 to content associated with the erased content. For example, as illustrated in the right diagram of FIG. 3, the display control unit 110-1 removes the given effect from the projection image and the display image, and switches the display of the display unit 112 to the video C4 associated with the image c4.

Returning to the description about the configuration of the display device 100 with reference to FIG. 2, the display unit 112 performs the display of the content, based on the control by the display control unit 110-1. The projection unit 114 performs the projection of the content, based on the control by the display control unit 110-1. Note that a plurality of projection unit 114 may be provided in the display device 100.

[2-2. Processing of Display Device in First Embodiment of the Present Disclosure]

Figure 4:
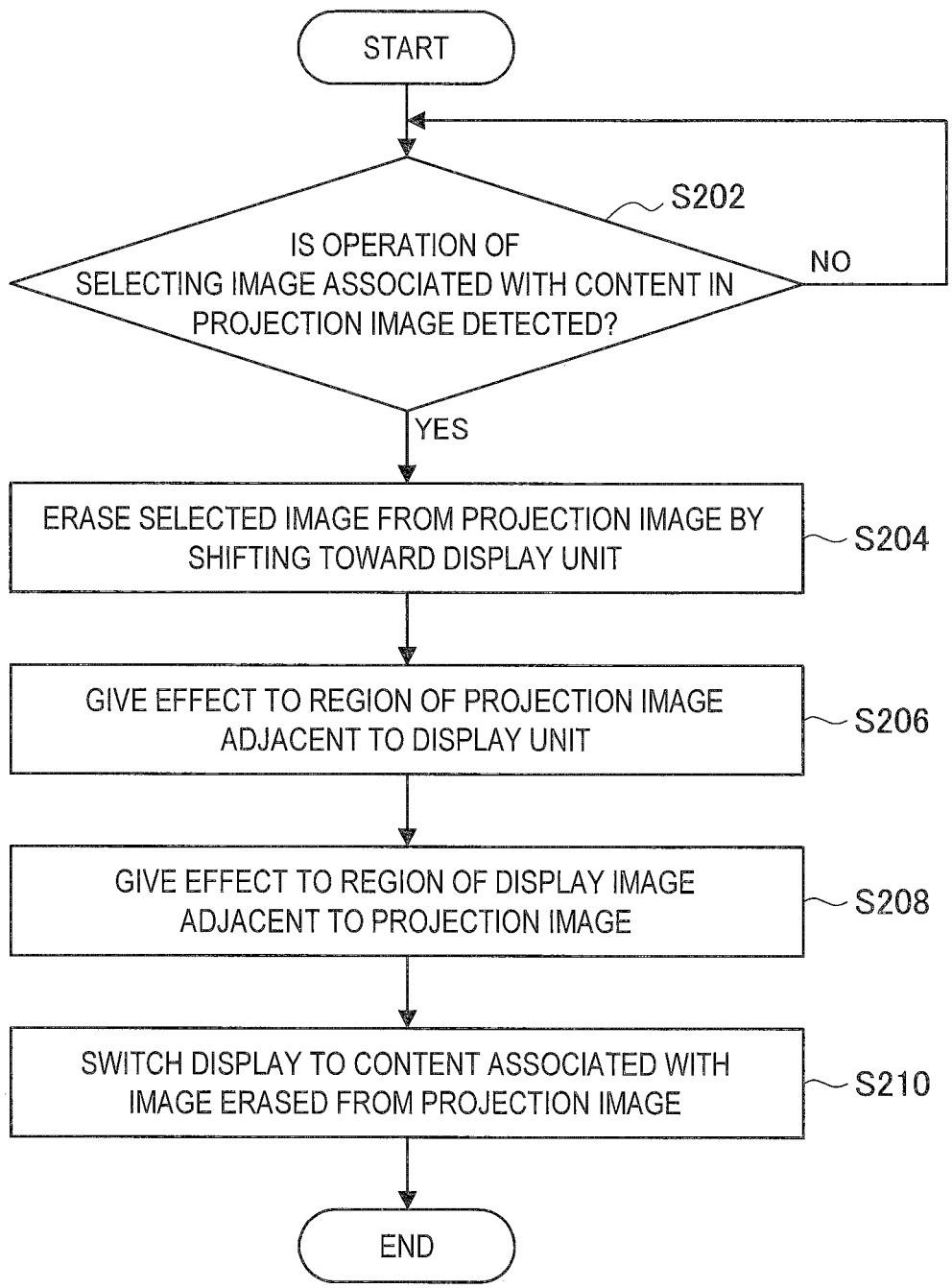
FIG. 4 is a flowchart conceptually illustrating processing of a display device in the first embodiment of the present disclosure.

Next, the processing of the display device 100 according to the first embodiment of the present disclosure will be described with reference to FIG. 4. FIG. 4 is a flowchart conceptually illustrating the processing of the display device 100 in the first embodiment of the present disclosure.

First, the display device 100 waits until an operation of selecting an image associated with content in a projection image is detected by the operation detection unit 106 (step S202). Specifically, after the reception unit 102 receives operation information from the controller 10 that is operated by a user, the operation detection unit 106 detects the operation of the display device 100 corresponding to the operation of the user on the controller 10, based on the operation information received by the reception unit 102.

In step S202, when it is detected by the operation detection unit 106 that the operation of the user is the operation of selecting the image associated with the content in the projection image, the display control unit 110-1 erases the selected image from the projection image by shifting the selected image toward the display unit (step S204).

Subsequently, the display control unit 110-1 gives an effect to a region of the projection image adjacent to the display unit (step S206). Subsequently, the display control unit 110-1 gives an effect to a region of the display image adjacent to the projection image (step S208). Note that since the processing of giving the effect is overlapped with the above description, repeated explanation thereof will be omitted.

Subsequently, the display control unit 110-1 switches the display of the display unit 112 to content associated with the content erased from the projection image (step S210).

According to the first embodiment of the present disclosure, when a portion of the projection image is erased by being shifted in a direction toward the display unit 112, the display device 100 switches the display of the display unit 112 to the content associated with a portion of the erased projection image by changing the display of a portion of the adjacent region of each of the display image and the projection image. By changing the display of the adjacent region of each of the projection image and the display image, the user can intuitively understand that a portion of the erased projection image is associated with the change in the display of the display unit 112.

[2-3. Modification of First Embodiment of the Present Disclosure]

So far, the first embodiment of the present disclosure has been described. Note that the present embodiment is not limited to the above example. In the following, first to seventh modifications of the present embodiment will be described.

(First Modification)

Figure 5:
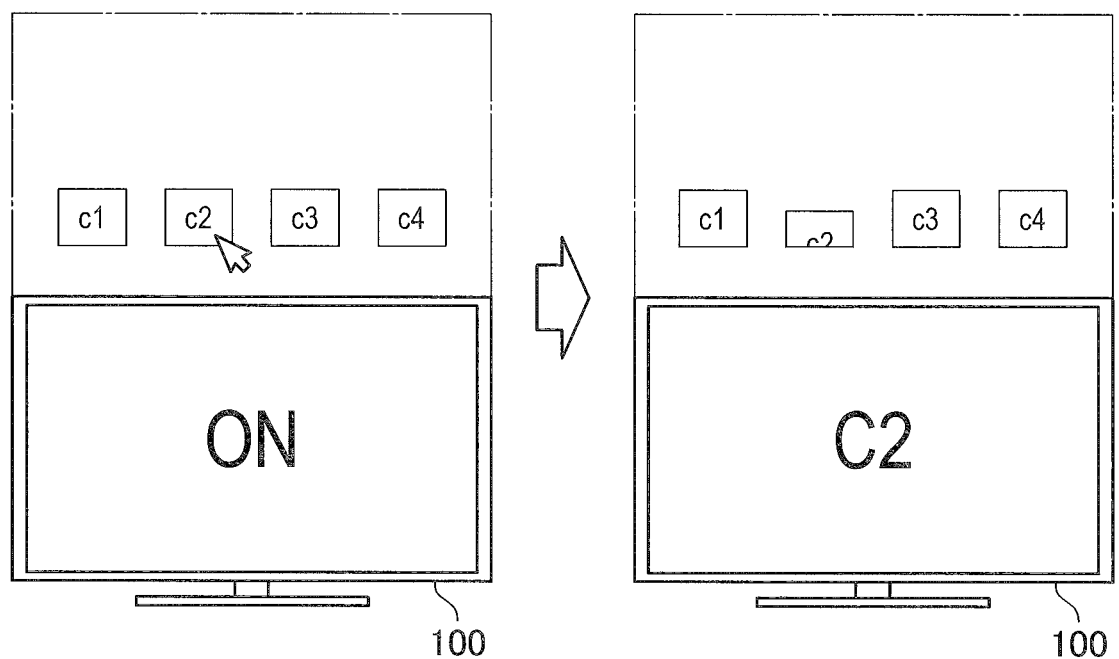
FIG. 5 is a diagram illustrating an example of a change in each of a display image and a projection image of a display device in a first modification of the first embodiment of the present disclosure.

As the first modification of the present embodiment, after a portion of the projection image is partially erased by shifting in a direction toward the display unit 112, the display control unit 110-1 may switch the display of the display unit 112 to the content associated with a portion of the projection image. Specifically, description will be provided with reference to FIG. 5. FIG. 5 is a diagram illustrating an example of a change in each of a display image and a projection image of the display device 100 in the first modification of the first embodiment of the present disclosure.

First, the display control unit 110-1 displays content on the display unit 112 and projects content on the projection unit 114. For example, as illustrated in the left diagram of FIG. 5, the display control unit 110-1 may display a video on the display unit 112 and project images c1 to c4, which are GUIs of the video displayed on the display unit 112, on the projection unit 114 at the upper rear side of the display surface of the display unit 112.

Then, the display control unit 110-1 changes the projection image, based on a user operation detected by the operation detection unit 106, such that the projected content is partially erased by shifting the projected content toward the display unit 112. For example, as illustrated in the left diagram of FIG. 5, when the user selects the projected image c2, the operation detection unit 106 may detect the operation of selecting the image c2. Then, as illustrated in the right diagram of FIG. 5, the display control unit 110-1 may change the projection image, based on the operation detected by the operation detection unit 106, such that the image c2 is shifted toward the display unit 112 and the lower side of the image c2 is erased from the projection image according to the shift. When the image c2 is shifted in a predetermined amount, the display control unit 110-1 may finish changing the projection image.

Then, the display control unit 110-1 switches the display of the display unit 112 to content associated with the changed projected content. For example, as illustrated in the right diagram of FIG. 5, the display control unit 110-1 switches the display of the display unit 112 to the video C2 associated with the image c2. After the GUI of the content in the projection image is partially erased by shifting in a direction toward the display unit 112, the display control unit 110-1 switches the display of the display unit 112 to the content associated with the relevant GUI. Therefore, since the display of the display unit 112 is switched by partially erasing the GUI on the projection image, the user can intuitively understand that the content associated with the partially erased GUI on the projection image is displayed on the display unit 112.

(Second Modification)

As the second modification of the present embodiment, when the content displayed on the display unit 112 is switched, the display control unit 110-1 may change the projection image as if a portion of the projection image pops out in an opposite direction to the direction toward the display unit 112. For example, when the operation detection unit 106 detects a content switching operation, the display control unit 110-1 may switch the content displayed on the display unit 112 to the content based on the operation. The display control unit 110-1 may change the projection image as if an image associated with the content displayed on the display unit 112 pops out from the display unit 112 to the projection image.

The display control unit 110-1 changes the projection image as if a portion of the projection image pops out from the display unit 112, together with the switching of the content displayed on the display unit 112. Therefore, by giving the projection image the effect that pops out the image from the display unit 112 according to the switching of the display of the display unit 112, the user can intuitively understand that the popped image is the image associated with the content displayed on the display unit 112.

(Third Modification)

Figure 6:
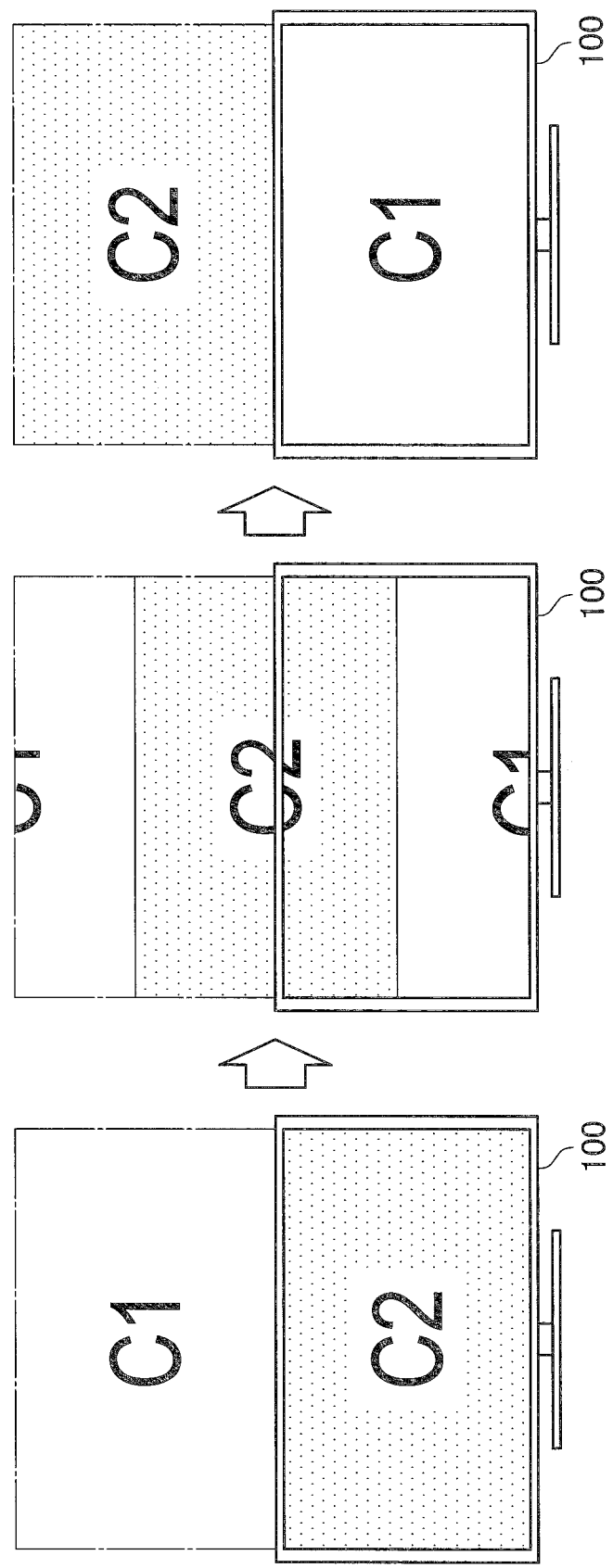
FIG. 6 is a diagram illustrating an example of a change in each of a display image and a projection image of a display device in a third modification of the first embodiment of the present disclosure.

As the third modification of the present embodiment, the display control unit 110-1 may shift the content projected by the projection unit 114 to the display screen of the display unit 112 by shifting the content displayed on the display unit 112 to the projection screen of the projection unit 114. Specifically, description will be provided with reference to FIG. 6. FIG. 6 is a diagram illustrating an example of a change in each of a display image and a projection image of the display device 100 in the third modification of the first embodiment of the present disclosure.

First, the display control unit 110-1 displays content on the display unit 112 and projects content on the projection unit 114. For example, as illustrated in the left diagram of FIG. 6, the display control unit 110-1 may display a video C2 on the display unit 112 and project a video C1 on the projection unit 114 at the upper rear side of the display surface of the display unit 112.

Then, the display control unit 110-1 shifts the content projected by the projection unit 114 to the display screen of the display unit 112 by shifting the content displayed on the display unit 112 to the projection screen of the projection unit 114, based on a user operation detected by the operation detection unit 106. For example, as illustrated in the middle diagram of FIG. 6, when the operation detection unit 106 detects a content replacement operation, the display control unit 110-1 may project the video C2 displayed on the display unit 112 by shifting the video C2 from the lower portion of the projection screen, while shifting the video C1 projected by the projection unit 114 to the upper portion of the projection screen. Simultaneously, the display control unit 110-1 may display a portion of the video C1 projected by the projection unit 114 by shifting the video C1 from the lower portion of the display screen, while shifting the video C2 displayed on the display unit 112 to the upper portion of the display screen.

Then, when the shift of the content is completed, the display control unit 110-1 ends the content replacement processing. For example, as illustrated in the left diagram of FIG. 6, the display control unit 110-1 may end the content replacement processing when the entire video C1 is shifted to the display screen of the display unit 112 and the entire video C2 is shifted to the projection screen of the projection unit.

In this way, the display control unit 110-1 shifts the content projected by the projection unit 114 to the display screen of the display unit 112, while shifting the content displayed on the display unit 112 to the projection screen of the projection unit 114. Therefore, by shifting the content across the display screen and the projection screen, the display screen and the projection screen can be shown to the user as if the screens are a single continuous screen. The display control unit 110-1 may shift the content in a state of being played back. Therefore, the user can replace the content without missing the content, while not stopping the playback of the content during the replacement of the content.

(Fourth Modification)

As the fourth modification of the present embodiment, the display control unit 110-1 may shift the GUI across the projection image and the display image. For example, the display control unit 110-1 may display the GUI at a position of the display image corresponding to a position that is erased from the projection image of the GUI, while the GUI on the projection image is erased from the projection image by being shifted toward the display unit 112 according to the user operation. The operation of the projection image and the display image can be performed without switching the GUI in such a manner that the display control unit 110-1 shifts the GUI in association with the projection image and the display image.

(Fifth Modification)

Figure 7A:
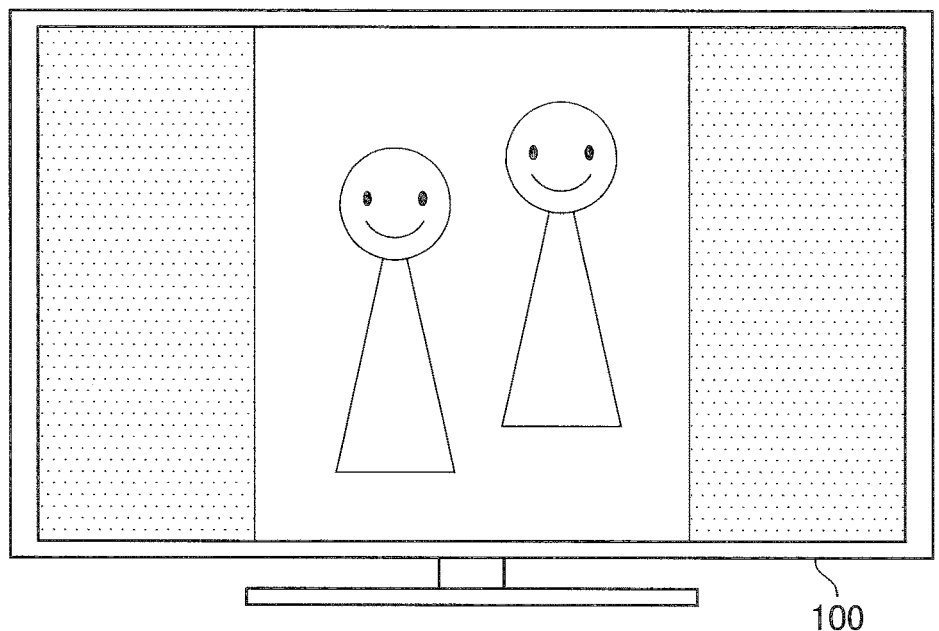
FIG. 7A is a diagram illustrating an example of displaying an image on only a display unit of a display device in a fifth modification of the first embodiment of the present disclosure.
Figure 7B:
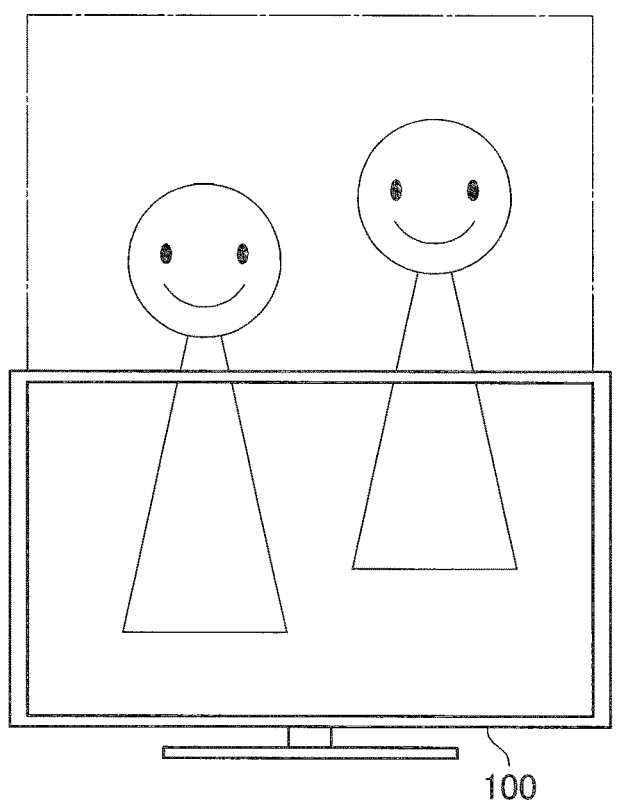
FIG. 7B is a diagram illustrating an example of displaying a single image with a display image and a projection image of a display device in the fifth modification of the first embodiment of the present disclosure.

As the fifth modification of the present embodiment, the display control unit 110-1 may enlarge single content by combining a projection image and a display image. Specifically, the display control unit 110-1 projects a portion of content on the projection unit 114 and displays a remaining portion of the content on the display unit 112. More specifically, description will be provided with reference to FIGS. 7A and 7B. FIG. 7A is a diagram illustrating an example of displaying an image on only the display unit 112 of the display device 100 in the fifth modification of the first embodiment of the present disclosure. FIG. 7B is a diagram illustrating an example of displaying a single image by a display image and a projection image of the display device 100 in the fifth modification of the first embodiment of the present disclosure.

As illustrated in FIG. 7A, for example, an image that is longer in a vertical direction than in a horizontal direction may be displayed on the display unit 112. In this case, a blank portion where no image is displayed occurs in the display unit 112. Therefore, the display control unit 110-1 enlarges single content by combining a projection image and a display image. For example, as illustrated in FIG. 7B, the display control unit 110-1 may project an upper portion of the vertically long image on the projection unit 114 in the entire projection image and display a lower portion of the remaining image on the display unit 112 in the entire display image. Therefore, the blank portion of the display unit 112 can be reduced.

The above example has been described to the effect that the projection unit 114 projects the projection image at the upper rear side of the display surface of the display unit 112 and enlarges the vertically long image, but the projection unit 114 may project a projection image on either or both of a left rear side and a right rear side of the display surface of the display unit 112 and enlarge a horizontally long image. In this way, the display control unit 110-1 divides the content and projects and displays the divided content on the projection unit 114 and the display unit 112, so that the display region of the content is increased to improve the visibility of the user.

(Sixth Modification)

Figure 8A:
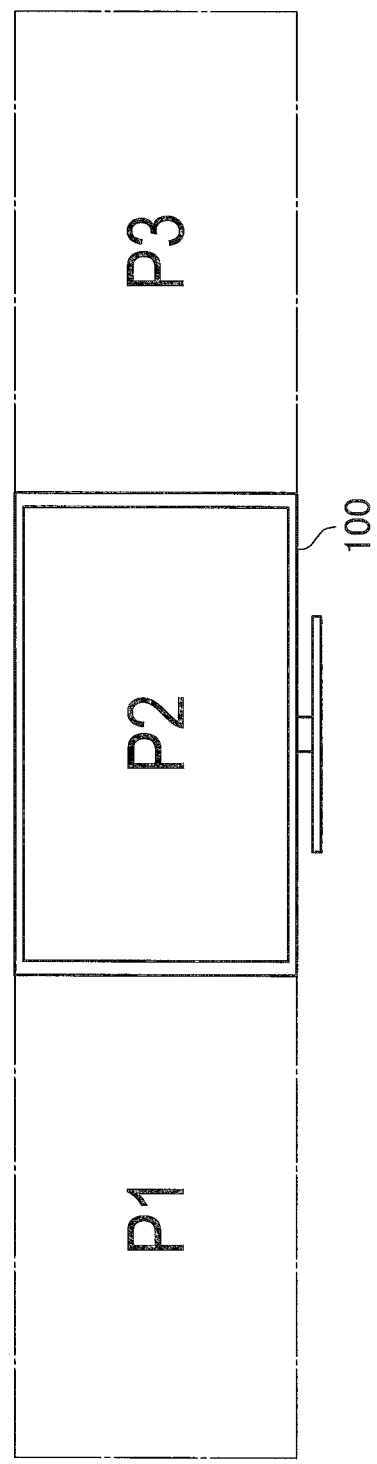
FIG. 8A is a diagram illustrating an example of enlarging a display region of content displayed on a display unit by a projection unit of a display device in a sixth modification of the first embodiment of the present disclosure.
Figure 8B:
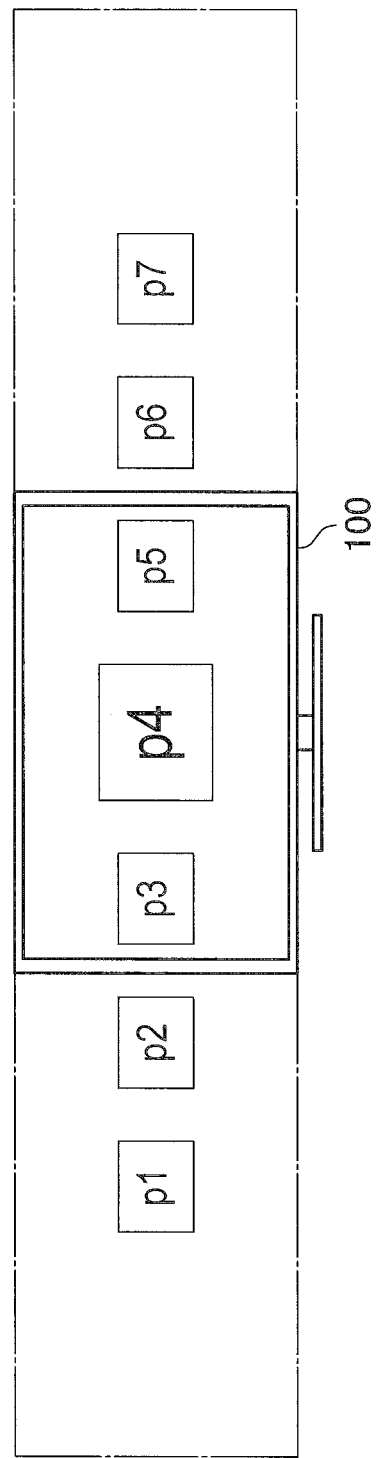
FIG. 8B is a diagram illustrating another example of enlarging a display region of content displayed on a display unit by a projection unit of a display device in the sixth modification of the first embodiment of the present disclosure.

As the sixth modification of the present embodiment, the display control unit 110-1 may enlarge a display region of content by combining a projection image and a display image. Specifically, description will be provided with reference to FIGS. 8A and 8B. FIG. 8A is a diagram illustrating an example of enlarging a display region of content displayed on the display unit 112 by the projection unit 114 of the display device 100 in the sixth modification of the first embodiment of the present disclosure. FIG. 8B is a diagram illustrating another example of enlarging a display region of content displayed on the display unit 112 by the projection unit 114 of the display device 100 in the sixth modification of the first embodiment of the present disclosure.

When the projection unit 114 can project images on the left rear side and the right rear side of the display surface of the display unit 112, the display control unit 110-1 may project images of an image list before and after an image displayed on the display unit 112 on the left rear side and the right rear side of the display surface of the display unit 112, based on a user operation or automatically. For example, as illustrated in FIG. 8A, when an image P2 is displayed on the display unit 112, the display control unit 110-1 may project an image P1 on the left rear side of the display surface of the display unit 112 and project an image P3 on the right rear side of the display surface of the display unit 112.

Also, when the projection unit 114 can project images on the left rear side and the right rear side of the display surface of the display unit 112, the display control unit 110-1 may project a thumbnail list displayed on the display unit 112 by enlarging the thumbnail list on the left rear side and the right rear side of the display surface of the display unit 112, based on a user operation or automatically. For example, as illustrated in FIG. 8B, when thumbnails p3 to p5 of images are displayed on the display unit 112, the display control unit 110-1 may project thumbnails p1 and p2 on the left rear side of the display surface of the display unit 112 and project thumbnails p6 and p7 on the right rear side of the display surface of the display unit 112. In this way, since the display control unit 110-1 displays the single content over the projection image and the display image, the display quantity of content is increased and the user can browse a lot of information at a time.

(Seventh Modification)

Figure 9:
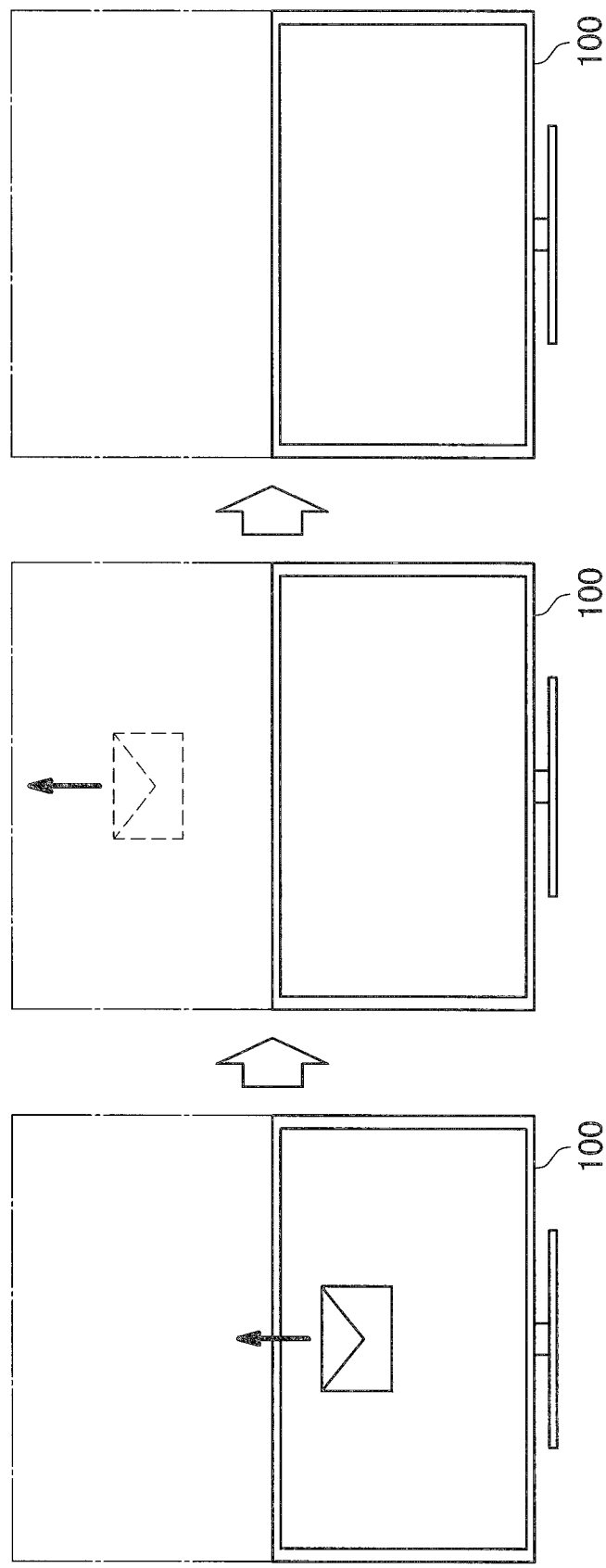
FIG. 9 is a diagram illustrating an example in which an image of a display device is erased by shifting over a display image and a projection image in a seventh modification of the first embodiment of the present disclosure.

As the seventh modification of the present embodiment, the display control unit 110-1 may change a display image and a projection image such that the display of the image is changed to disappear, while shifting the image across the projection image and the display image. Specifically, description will be provided with reference to FIG. 9. FIG. 9 is a diagram illustrating an example in which an image of the display device 100 is erased while shifting over a display image and a projection image in the seventh modification of the first embodiment of the present disclosure.

When predetermined processing is performed, the display control unit 110-1 displays an image associated with the relevant processing on the display unit 112 and shifts the image toward a projection image. For example, as illustrated in the left diagram of FIG. 9, when processing of sending an email is performed, the display control unit 110-1 may display an image of an envelope on the display unit 112 and shift the image of the envelope displayed on the display unit 112 in a direction toward the projection image of the projection unit 114.

Then, when the shifted image reaches an upper end of the display unit 112, the display control unit 110-1 displays the relevant image at a position of the projection image corresponding to a position of the relevant image on the display image, and continuously shifts the relevant image in the shifting direction. For example, the display control unit 110-1 shifts the image of the envelope as if the display image and the projection image are an image of human connection. Also, the display control unit 110-1 changes the display of the relevant image according to a shift distance of an image to be shifted. For example, as illustrated in the middle diagram of FIG. 9, the display control unit 110-1 may make the display of the image of the envelope thin according to the shift. The display control unit 110-1 may change a transparency and a degree of blur of the image of the envelope according to the shift.

The display control unit 110-1 shifts the relevant image to a predetermined distance and then erases the relevant image from the projection image. For example, as illustrated in the left diagram of FIG. 9, the display control unit 110-1 may shift the image of the envelope to the upper end of the projection image and then erase the relevant image from the projection image. In this way, the display control unit 110-1 shifts the image across the display image and the projection image and changes the display image and the projection image such that the display of the image is changed to disappear according to the shift. Therefore, since the image to be shifted from the display image to the projection image is changed by taking over the change in the display image, the display image and the projection image can be recognized as an integrated image by the user.

3. Second Embodiment of the Present Disclosure

[3-1. Configuration of Display Device According to Second Embodiment of the Present Disclosure]

Next, a configuration of a display device 100 according to a second embodiment of the present disclosure will be described. A description about a configuration substantially identical to the configuration of the display device 100 according to the first embodiment will be omitted. A display control unit 110-2 is a display control unit 110 according to the second embodiment of the present disclosure.

Figure 10A:
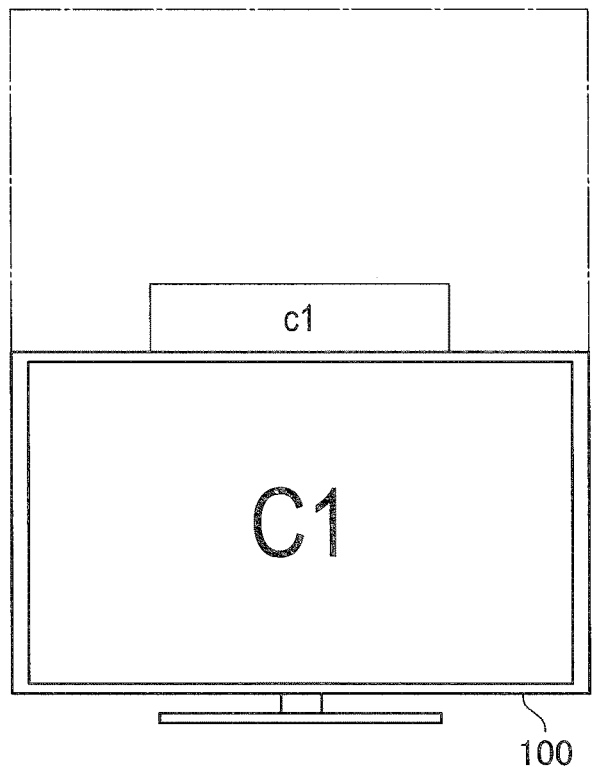
FIG. 10A is a diagram illustrating an example of a projection position of content on a projection image of a display device according to a second embodiment of the present disclosure.
Figure 10B:
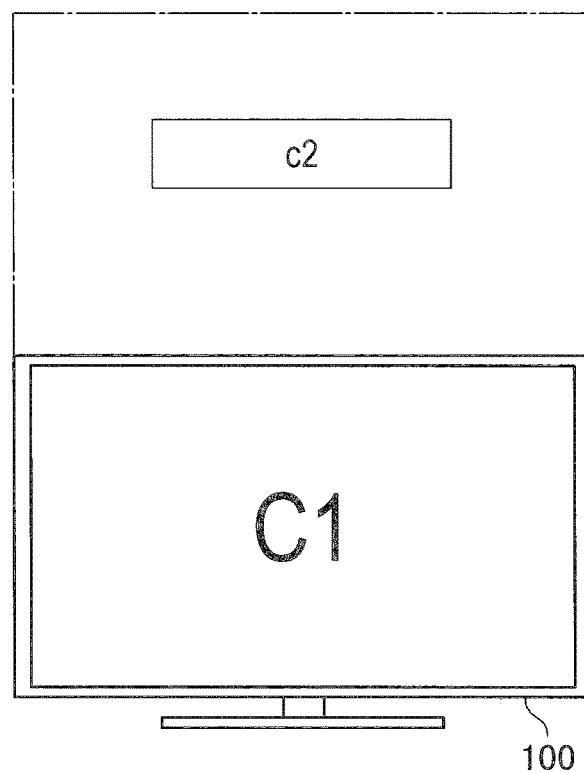
FIG. 10B is a diagram illustrating another example of a projection position of content on a projection image of a display device according to the second embodiment of the present disclosure.

The display control unit 110-2 gives a projection image of the projection unit 114 a display effect that evokes the integration of the projection image and the display unit 112. Specifically, the display control unit 110-2 generates a projection image such that content associated with display content of the display unit 112 is adjacent to the display unit 112. For example, the display control unit 110-2 determines whether content projected on the projection unit 114 is associated with content displayed on the display unit 112 and, when it is determined as being associated, projects the content determined as being associated at a position of the projection image adjacent to the display unit 112. Furthermore, details will be described with reference to FIGS. 10A and 10B. FIG. 10A is a diagram illustrating an example of the projection position of the content on the projection image of the display device 100 according to the second embodiment of the present disclosure. FIG. 10B is a diagram illustrating another example of the projection position of the content on the projection image of the display device 100 according to the second embodiment of the present disclosure.

First, the display control unit 110-2 acquires the content to be projected on the projection unit 114 and determines whether there is an association with the content displayed on the display unit 112. When it is determined that there is the association, the display control unit 110-2 generates the projection image in which the content is located at a position of the projection image adjacent to the display unit 112, and projects the generated image on the projection unit 114. For example, as illustrated in FIG. 10A, the display control unit 110-2 may acquire c1 being a GUI, determine whether there is an association with a video C1 displayed on the display unit 112, and determine that there is the association. The display control unit 110-2 may generate the projection image in which c1 is located in the lower portion of the projection image that is a region adjacent to the display unit 112, and project the generated image on the projection unit 114.

On the other hand, when it is determined that the acquired content is not associated with the content displayed on the display unit 112, the display control unit 110-2 generates the projection image in which the content is located at a position of the projection image far from the position adjacent to the display unit 112, and projects the generated image on the projection unit 114. For example, as illustrated in FIG. 10B, the display control unit 110-2 may acquire c2 being a GUI, determine whether there is an association with a video C1 displayed on the display unit 112, and determine that there is no association. The display control unit 110-2 may generate the projection image in which c2 is located in the central portion of the projection image that is far from the region adjacent to the display unit 112, and project the generated image on the projection unit 114.

Regarding the determination as to the association with the content that is displayed on the display unit 112, information packaged in the content, meta information of the content, or information acquired from the Internet based on the meta information of the content may be used. For example, when the content to be displayed on the display unit 112 is a terrestrial digital broadcasting program and the content to be displayed on the projection unit 114 is a program title included in meta information of the relevant program, the display control unit 110-2 may determine that there is the association.

[3-2. Processing of Display Device in Second Embodiment of the Present Disclosure]

Figure 11:
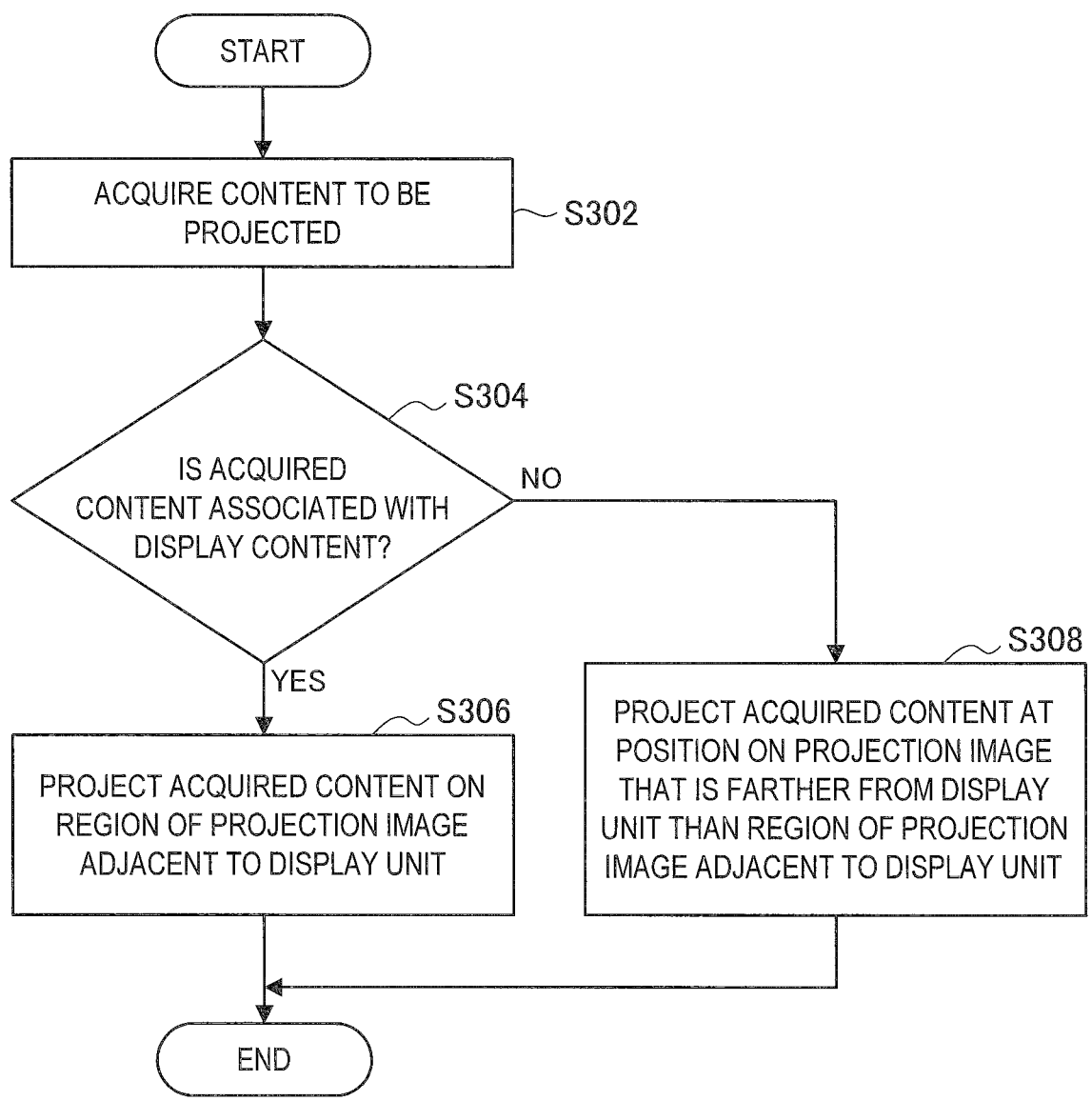
FIG. 11 is a flowchart conceptually illustrating processing of a display device in the second embodiment of the present disclosure.

Next, the processing of the display device 100 according to the second embodiment of the present disclosure will be described with reference to FIG. 11. FIG. 11 is a flowchart conceptually illustrating the processing of the display device 100 in the second embodiment of the present disclosure.

First, the display control unit 110-2 acquires the content to be projected on the projection unit 114 (step S302). Specifically, the display control unit 110-2 acquires the content to be projected on the projection unit 114 from the storage unit 108.

Subsequently, the display control unit 110-2 determines whether the acquired content is associated with the display content (step S304). Specifically, the display control unit 110-2 determines whether information on the acquired content is associated with information on the content to be displayed on the display unit 112. Note that since the processing of determining the association is overlapped with the above description, repeated explanation thereof will be omitted.

In step S304, when it is determined that the acquired content is associated with the display content, the display control unit 110-2 projects the acquired content in a region of the projection image adjacent to the display unit 112 (step S306). In step S304, when it is determined that the acquired content is not associated with the display content, the display control unit 110-2 projects the acquired content at a position on the projection image that is farther from the display unit 112 than the region of the projection image adjacent to the display unit 112 (step S308).

As described above, according to the second embodiment of the present disclosure, the display device 100 generates the projection image such that the content associated with the content to be displayed on the display unit 112 is adjacent to the display unit 112. Since the associated contents are displayed to be adjacent to each other, the user can intuitively understand that the adjacent contents are associated with each other.

[3-3. Modification of Second Embodiment of the Present Disclosure]

So far, the second embodiment of the present disclosure has been described. Note that the present embodiment is not limited to the above example. In the following, first to fifth modifications of the present embodiment will be described.

(First Modification)

Figure 12A:
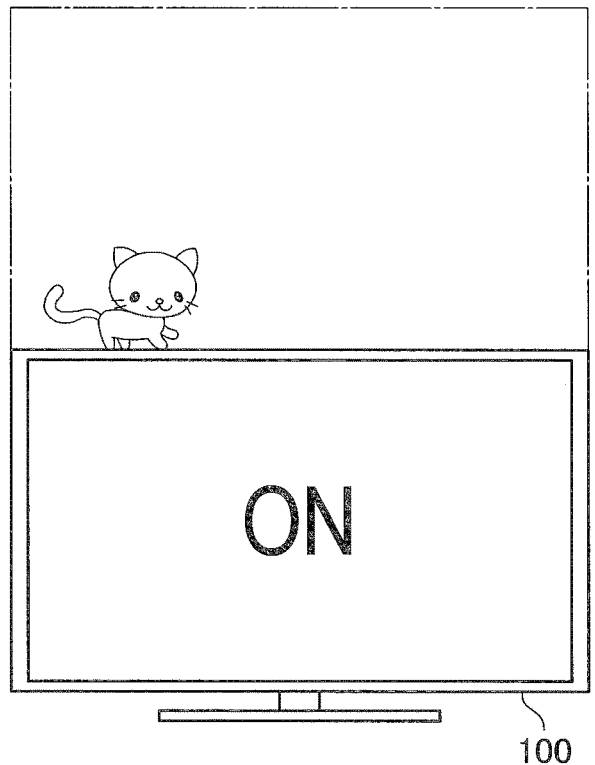
FIG. 12A is a diagram illustrating an example of projecting an image as if a character of a display device physically exists on a display unit in a first modification of the second embodiment of the present disclosure.

As the first modification of the present embodiment, the display control unit 110-2 may generate the projection image as if an image showing a character projected on the projection unit 114 physically exists on the display unit 112. Specifically, description will be provided with reference to FIG. 12A. FIG. 12A is a diagram illustrating an example of projecting the image as if the character of the display device 100 physically exists on the display unit 112 in the first modification of the second embodiment of the present disclosure.

First, the display control unit 110-2 acquires the image to be projected on the projection unit 114. For example, as illustrated in FIG. 12A, the display control unit 110-2 acquires an image of a cat.

Then, the display control unit 110-2 determines a position of the projection screen of the projection unit 114 with respect to the display screen of the display unit 112, generates the projection image in which the acquired image is located in the region of the projection image adjacent to the display unit 112, and projects the generated image on the projection unit 114. For example, as illustrated in FIG. 12A, the display control unit 110-2 determines that there is the projection screen at the upper rear side of the display surface of the display unit 112, generates the projection image in which the image of the cat is located in the region adjacent to the display unit 112, and projects the generated image on the projection unit 114.

The display control unit 110-2 may acquire information indicating a storage location of the image to be projected on the projection unit 114, and acquire the character image to be projected on the projection unit 114 from the relevant storage location according to the position of the projection screen of the projection unit 114 with respect to the display screen of the display unit 112. For example, the display control unit 110-2 may acquire meta information such as a URL indicating the storage location of the image associated with the relevant content of the content displayed on the display unit 112. Then, when the position of the projection screen of the projection unit 114 with respect to the display screen of the display unit 112 is the upper rear side of the display surface, the display control unit 110-2 acquires an image of a character being in a sitting posture from a location indicated by a URL. Alternatively, when the relevant position is the left rear side or the right rear side of the display surface of the display unit 112, the display control unit 110-2 may acquire an image of a character being in a standing posture from a location indicated by a URL. The display control unit 110-2 may generate the projection image in which the acquired character image is located in the portion of the projection unit 114 adjacent to the display unit 112, and project the generated image on the projection unit 114.

Figure 12B:
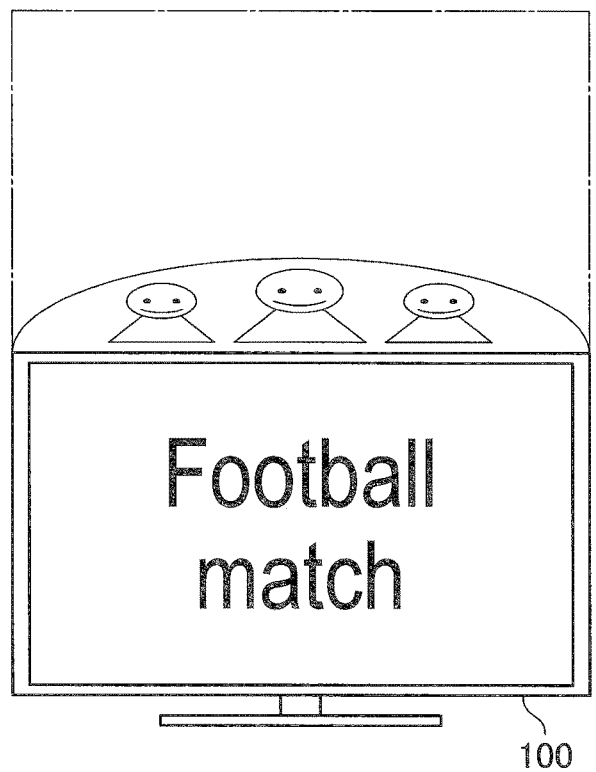
FIG. 12B is a diagram illustrating an example of projecting an image as if content of a display device is stuck on a display unit in the first modification of the second embodiment of the present disclosure.

In this way, the display control unit 110-2 generates the projection image in which the character image to be projected on the projection unit 114 is located in the region adjacent to the display unit 112. By projecting the character image in the region adjacent to the display unit 112, it can be shown to the user as if the character exists around the display unit 112. Also, in the present embodiment, the display control unit 110-2 may generate the projection image as if the content projected on the projection unit 114 is stuck on the display unit 112. Specifically, description will be provided with reference to FIG. 12B. FIG. 12B is a diagram illustrating an example of projecting the image as if the content of the display device 100 is stuck on the display unit 112 in the first modification of the second embodiment of the present disclosure.

First, the display control unit 110-2 acquires the content to be projected on the projection unit 114. For example, as illustrated in FIG. 12B, the display control unit 110-2 acquires a video of bleachers of a soccer match. Then, the display control unit 110-2 determines a position of the projection screen of the projection unit 114 with respect to the display screen of the display unit 112, generates the projection image appearing as if the acquired image is stuck to the display unit 112, and projects the generated image on the projection unit 114. For example, as illustrated in FIG. 12B, the display control unit 110-2 may determine the position of the projection screen of the projection unit 114 with respect to the display screen of the display unit 112, and determine that there is the projection screen on the display unit 112. The display control unit 110-2 may generate the projection image in which the image of the bleachers deformed as crushed in a direction toward the display unit 112 is located in the region adjacent to the display unit 112, and project the generated image on the projection unit 114.

In this way, the display control unit 110-2 generates the projection image in which the content where the content to be projected on the projection unit 114 is deformed in a direction toward the display unit 112 is located in the region adjacent to the display unit 112. Since the content to be displayed on the display unit 112 and the content to be projected on the projection unit 114 are integrally displayed, it is possible to provide the realistic sensation to the user.

(Second Modification)

Figure 13:
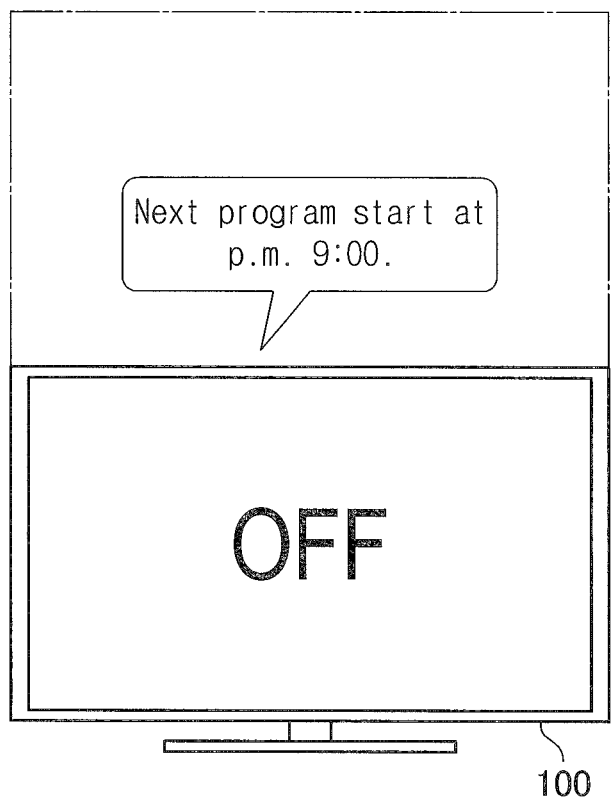
FIG. 13 is a diagram illustrating an example in which a text-superimposed image of a display device is projected in the second modification of the second embodiment of the present disclosure.

As the second modification of the present embodiment, the display control unit 110-2 may generate the projection image such that a text associated with the display content of the display unit 112 is superimposed on an image evoking a conversation. Specifically, description will be provided with reference to FIG. 13. FIG. 13 is a diagram illustrating an example in which a text-superimposed image of the display device 100 is projected in the second modification of the second embodiment of the present disclosure.

First, the display control unit 110-2 performs projection on the projection unit 114 in a state in which the power of the display unit 112 is turned off. For example, as illustrated in FIG. 13, the display control unit 110-2 may perform projection on the projection unit 114 in a state in which the power of the display unit 112 is turned off.

Then, the display control unit 110-2 acquires text information to be projected on the projection unit 114. For example, the display control unit 110-2 may acquire text information illustrated in FIG. 13 from the storage unit 108. The text information may be acquired from the outside of the display device through a network.

Then, the display control unit 110-2 generates the projection image in which the text information is superimposed on the image evoking a conversation, and projects the generated image on the projection unit 114. For example, as illustrated in FIG. 13, the display control unit 110-2 may generate the projection image in which the acquired text information is superimposed on a balloon image, and project the generated image on the projection unit 114. The above example has been described in the state in which the power of the display unit 112 is turned off, but the display control unit 110-2 may also perform the above processing in a case where the display unit 112 displays the content in a state in which the power of the display unit 112 is turned on.

Figure 14:
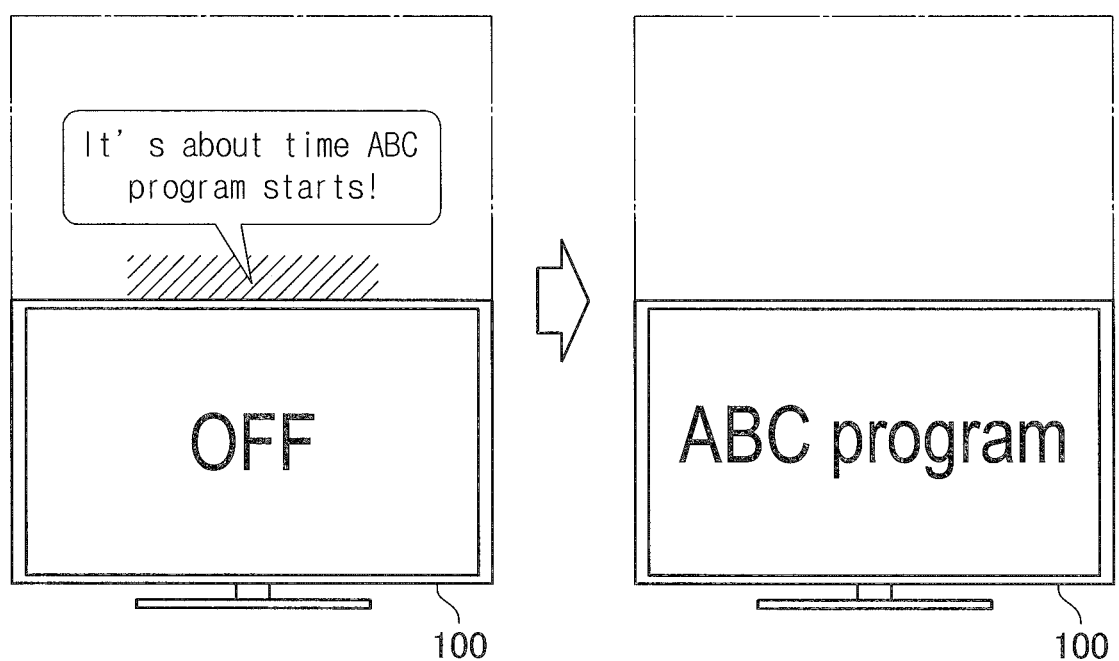
FIG. 14 is a diagram illustrating an example in which a text-superimposed image is projected based on event information of a display device in the second modification of the second embodiment of the present disclosure.

In this way, the display control unit 110-2 generates the projection image in which a text is superimposed on an image evoking a conversation, and projects the generated image on the projection unit 114. Since the display unit 112 is personified by superimposing the text on the image evoking a conversion, the user can have affinity to the display unit 112. Also, the display control unit 110-2 may generate the projection image in which the text is superimposed on the image evoking a conversation, based on information acquired from software or a device incorporated in the display device 100. Specifically, description will be provided with reference to FIG. 14. FIG. 14 is a diagram illustrating an example in which a text-superimposed image is projected based on event information of the display device 100 in the second modification of the second embodiment of the present disclosure.

First, the display control unit 110-2 performs projection on the projection unit 114 in a state in which the power of the display unit 112 is turned off. For example, as illustrated in the left diagram of FIG. 14, the display control unit 110-2 may perform projection on the projection unit 114 in a state in which the power of the display unit 112 is turned off.

Then, the display control unit 110-2 acquires information from the software or the like incorporated in the display device 100. For example, the software or the like may be a content reservation program, and the acquired information may be content reservation information.

Then, the display control unit 110-2 generates the projection image to be projected on the projection unit 114 based on the acquired information, and projects the generated image on the projection unit 114. For example, as illustrated in the left diagram of FIG. 14, the display control unit 110-2 may generate an image including a text to the effect that a start time of reserved content is approaching, based on the acquired content reservation information, and project the generated image on the projection unit 114.

Figure 15:
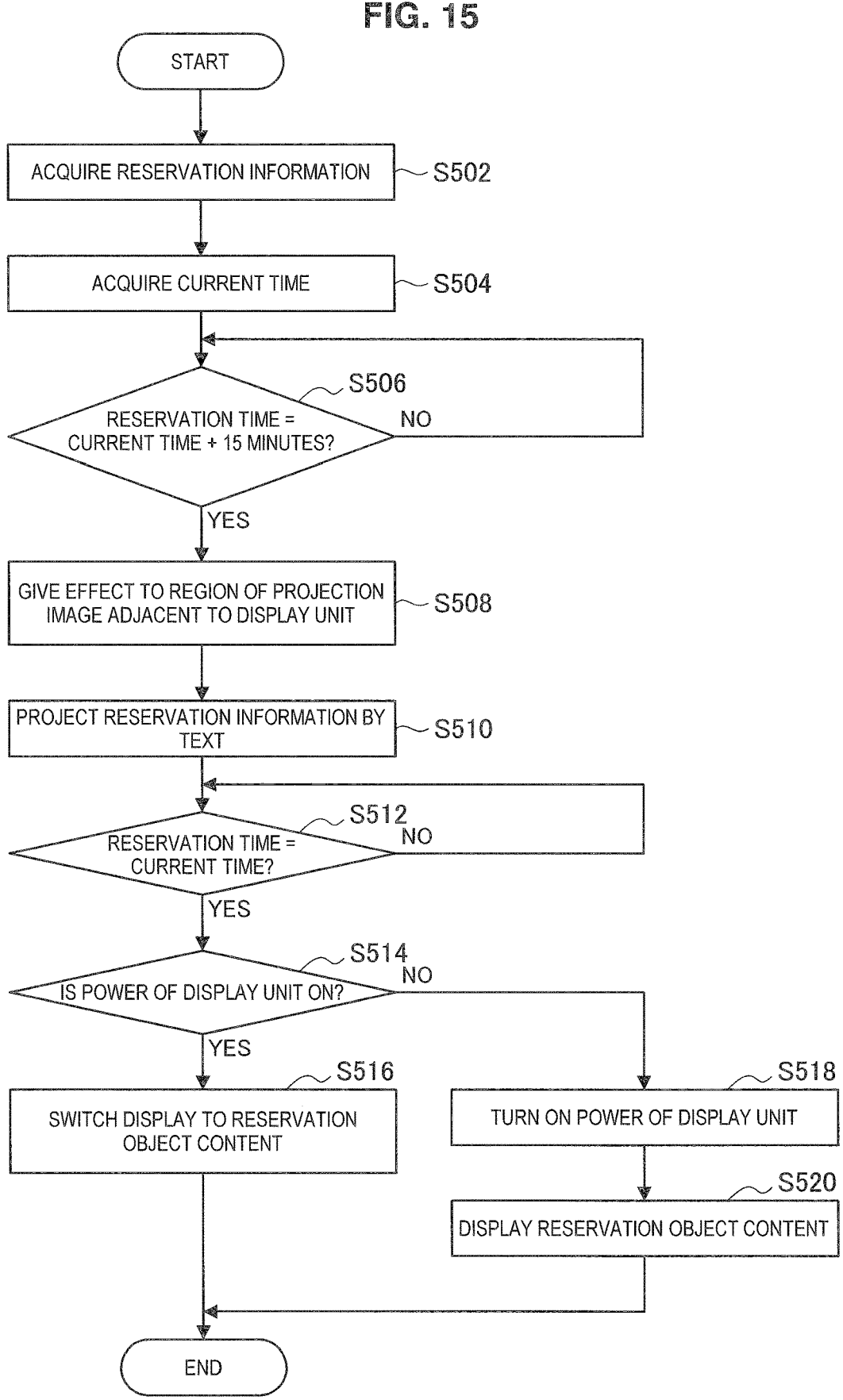
FIG. 15 is a flowchart conceptually illustrating processing of projecting a text-superimposed image based on content reservation information of a display device in the second modification of the second embodiment of the present disclosure.

Then, the display control unit 110-2 turns on the power of the display unit 112, based on the acquired information, and displays the content associated with the acquired information on the display unit 112. For example, as illustrated in the right diagram of FIG. 14, the display control unit 110-2 may perform matching between the content start time included in the reservation information and the current time, turn on the power of the display unit 112 when the current time is the content start time, and display the reserved content on the display unit 112. Furthermore, the processing of the display device 100 in the present modification will be described with reference to FIG. 15. FIG. 15 is a flowchart conceptually illustrating the processing of projecting a text-superimposed image based on content reservation information of the display device 100 in the second modification of the second embodiment of the present disclosure.

First, the display control unit 110-2 acquires reservation information (step S502). For example, the display control unit 110-2 may acquire content reservation information from a content reservation program or the like incorporated in the display device 100.

Subsequently, the display control unit 110-2 acquires a current time (step S504).

Subsequently, the display control unit 110-2 determines whether the current time is 15 minutes before a reservation time (step S506).

In step S506, when it is determined that the current time is 15 minutes before the reservation time, the display control unit 110-2 gives an effect to a region of the projection image adjacent to the display unit 112 (step S508). Since the processing of giving the effect is substantially the same as the processing of giving the effect according to the first embodiment, a detailed description thereof will be omitted.

Subsequently, the display control unit 110-2 projects the reservation information by a text (step S510). Specifically, the display control unit 110-2 projects the text included in the acquired reservation information on the projection unit 114 as the projection image. The projected text may be stored in a location indicated by the acquired reservation information. For example, the reservation information may indicate a URL and the display control unit 110-2 may acquire the text from a location indicated by the relevant URL.

Subsequently, the display control unit 110-2 determines whether the reservation time is the current time (step S512).

In step S512, when it is determined that the reservation time is the current time, the display control unit 110-2 determines whether the power of the display unit 112 is turned on (step S514).

In step S514, when it is determined that the power of the display unit 112 is turned on, the display control unit 110-2 switches the display to the reservation object content (step S516). Specifically, the display control unit 110-2 specifies the reservation object content from the acquired reservation information and switches the display of the display unit 112 to the specified content. In step S514, when it is determined that the power of the display unit 112 is not turned on, the display control unit 110-2 turns on the power of the display unit 112 (step S518) and displays the reservation object content (step S520).

In this way, the display control unit 110-2 generates the projection image in which a text is superimposed on an image evoking a conversation, based on information acquired from the software or the like incorporated in the display device 100, and projects the generated image on the projection unit 114. Since the text acquired from other software is automatically projected, the display device 100 can be used for the user as a transmission device.

(Third Modification)

Figure 16:
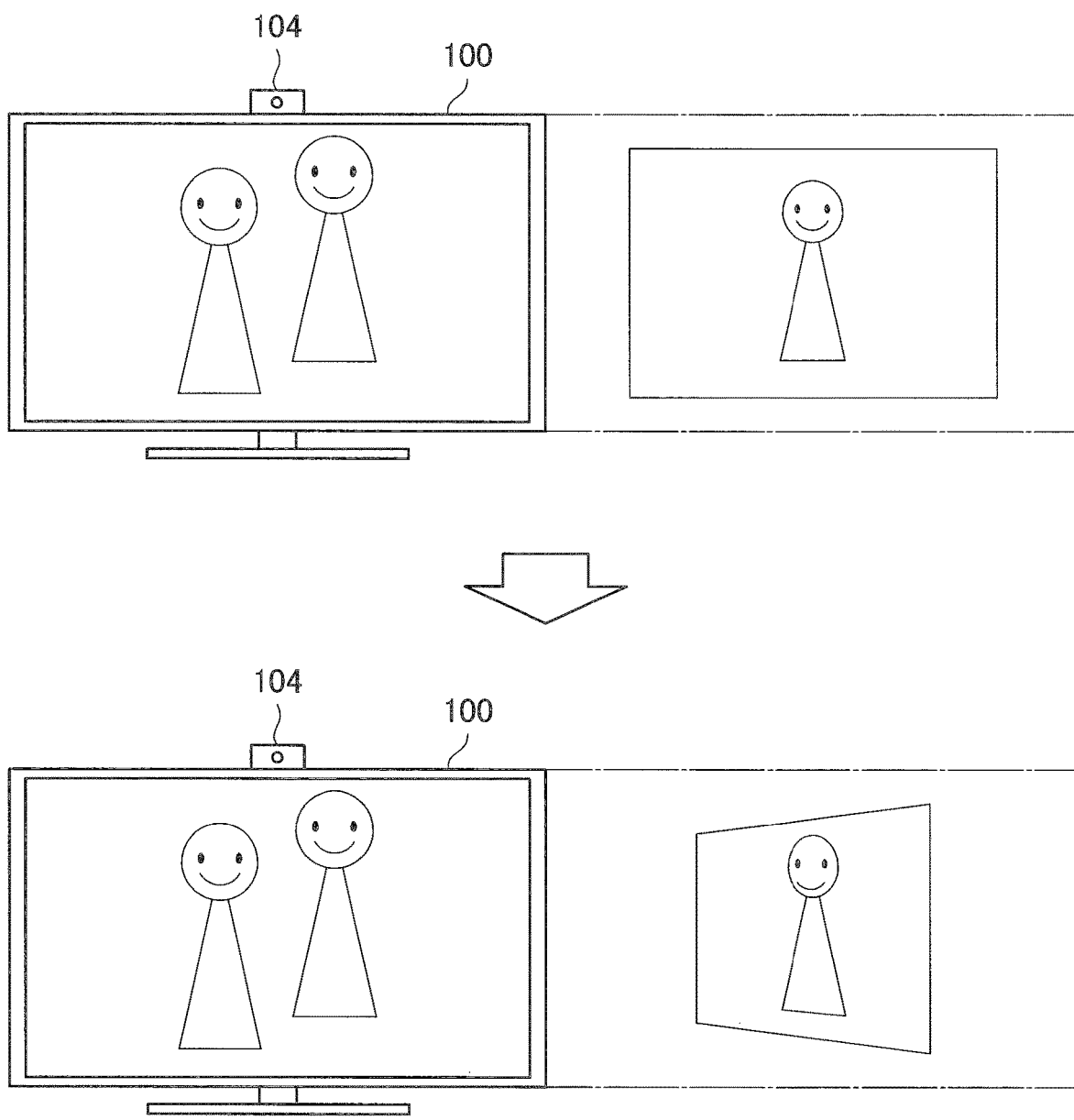
FIG. 16 is a diagram illustrating an example of generating a three-dimensional space by a display image and a projection image of a display device in a third modification of the second embodiment of the present disclosure.

As the third modification of the present embodiment, the display control unit 110-2 may generate a three-dimensional space by the display image and the projection image by tilting the projection image upon projection. Specifically, the display device 100 further includes a determination unit 116 that determines a viewing situation of a user with respect to the display unit 112. When it is determined by the determination unit 116 that the user is in the viewing situation with respect to the display unit 112, the display control unit 110-2 projects the projection image in which a trapezoidal distortion is given to the projection image such that a bottom close to the display unit 112 is relatively shorter than the other bottom. More specifically, description will be provided with reference to FIG. 16. FIG. 16 is a diagram illustrating an example of generating a three-dimensional space by a display image and a projection image of the display device 100 in the third modification of the second embodiment of the present disclosure.

First, the display control unit 110-2 displays content on the display unit 112 and projects content on the projection unit 114. For example, as illustrated in the upper diagram of FIG. 16, the display control unit 110-2 may display content in which two persons are imaged on the display unit 112 and project content in which one person is imaged on the projection unit 114.

Then, the imaging unit 104 captures the front of the display unit 112. For example, as illustrated in the upper diagram of FIG. 16, the display device 100 includes the imaging unit 104 provided on the display unit 112 to capture the front of the display unit 112. The imaging unit 104 may be provided at any position as long as the imaging unit 104 can capture the front of the display unit 112.

Then, the determination unit 116 performs image processing on the image acquired by the capturing of the imaging unit 104, and determines whether a user viewing the display unit 112 is present. When it is determined by the determination unit 116 that the user viewing the display unit is present, the display control unit 110-2 gives a trapezoidal distortion on the projection image such that a bottom close to the display unit 112 is relatively shorter than the other bottom, and projects the image, to which the trapezoidal distortion has been given, on the projection unit 114. For example, as illustrated in the lower diagram of FIG. 16, the display control unit 110-2 may change the projection image such that the projection image is tilted toward the display unit 112.

When it is determined that the user is in the viewing situation, the display device 100 gives a trapezoidal distortion to the projection image and projects the image to which the trapezoidal distortion has been given. By performing the trapezoidal distortion on the projection image such that the projection image is tilted toward the display unit 112, the user can feel a three-dimensional effect between the display image and the projection image.

(Fourth Modification)

As the fourth modification of the present embodiment, the display control unit 110-2 may project a portion of the projection image on the projection unit 114 while shifting the projection image vertically or horizontally. For example, the display control unit 110-2 may shift the projection position of the content projected on the projection unit 114 by a predetermined distance at regular time intervals in a direction away from the display unit 112. After shifting the relevant content a predetermined number of times, the display control unit 110-2 may shift the projection position of the relevant content by a predetermined distance at regular time intervals in a direction approaching the display unit 112. After shifting the relevant content a predetermined number of times, the display control unit 110-2 may shift the relevant content again in a direction away from the display unit 112 as described above.

In this way, the display control unit 110-2 projects the content of the projection image on the projection unit 114 while shifting the projection image vertically or horizontally. Since the content of the display image is shifted vertically or horizontally, the content of the projection image can be recognized as floating to the user.

(Fifth Modification)

Figure 17:
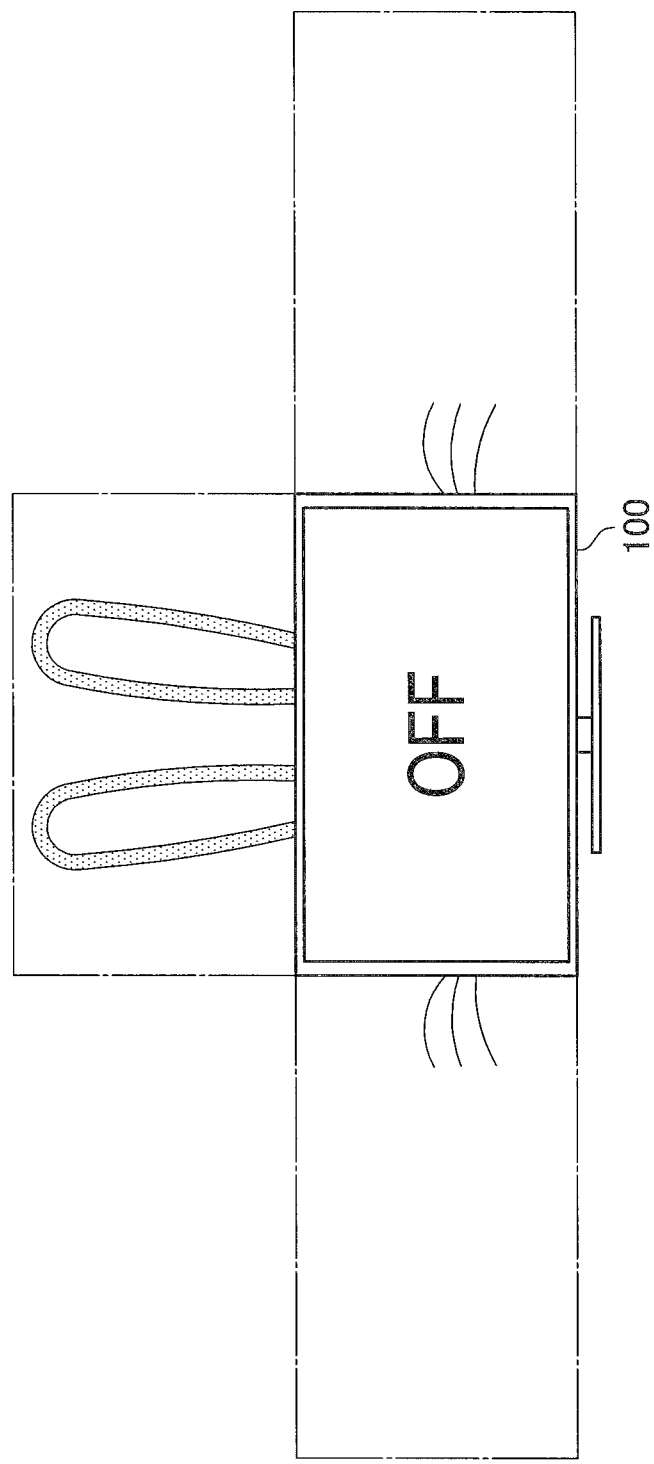
FIG. 17 is a diagram illustrating an example of decorating a display unit of a display device in a fifth modification of the second embodiment of the present disclosure.

As the fifth modification of the present embodiment, the display control unit 110-2 may project an image decorating the display unit 112 on the projection unit 114. Specifically, the display control unit 110-2 acquires a decoration image and decoration information and projects the decoration image on the projection unit 114, based on the decoration information. More specifically, description will be provided with reference to FIG. 17. FIG. 17 is a diagram illustrating an example of decorating the display unit 112 of the display device 100 in the fifth modification of the second embodiment of the present disclosure.

First, the display control unit 110-2 performs projection on the projection unit 114 in a state in which the power of the display unit 112 is turned off. For example, as illustrated in FIG. 17, the display control unit 110-2 may perform projection on the projection unit 114 in a state in which the power of the display unit 112 is turned off.

Then, the display control unit 110-2 acquires a decoration image and decoration information. The decoration information may be, for example, information including a projection position, a direction, or the like of the decoration image. For example, the display control unit 110-2 may acquire one ear image and paired two whiskers as the decoration image, and decoration information including the position information of each of the acquired images.

Then, the display control unit 110-2 determines the position of the projection screen of the projection unit 114 with respect to the display screen of the display unit 112. For example, as illustrated in FIG. 17, the display control unit 110-2 determines that the position of the projection screen is the upper rear side, the left rear side, and the right rear side of the display surface of the display unit 112.

Then, the display control unit 110-2 generates the projection image in which the decoration image is disposed based on the decoration information, and projects the generated image on the projection unit 114. For example, as illustrated in FIG. 17, the display control unit 110-2 may generate each of projection images in which the ear image is disposed on the projection image of the upper rear side of the display surface of the display unit 112 and the whisker images are disposed on the projection image of the left rear side and the right rear side of the display surface of the display unit 112, and project each of the generated projection images on the projection unit 114.

In this way, the display control unit 110-2 may project the image decorating the display unit 112 on the projection unit 114, based on the decoration information. By giving the decoration effect to the surrounding of the display unit 112, a value as interior can be given to the display device 100.

4. Third Embodiment of the Present Disclosure

[4-1. Configuration of Display Device According to Third Embodiment of the Present Disclosure]

Next, a configuration of a display device 100 according to a third embodiment of the present disclosure will be described. A description about a configuration substantially identical to the configuration of the display device 100 according to the first and second embodiments will be omitted. A display control unit 110-3 is a display control unit 110 according to the third embodiment of the present disclosure.

Figure 18:
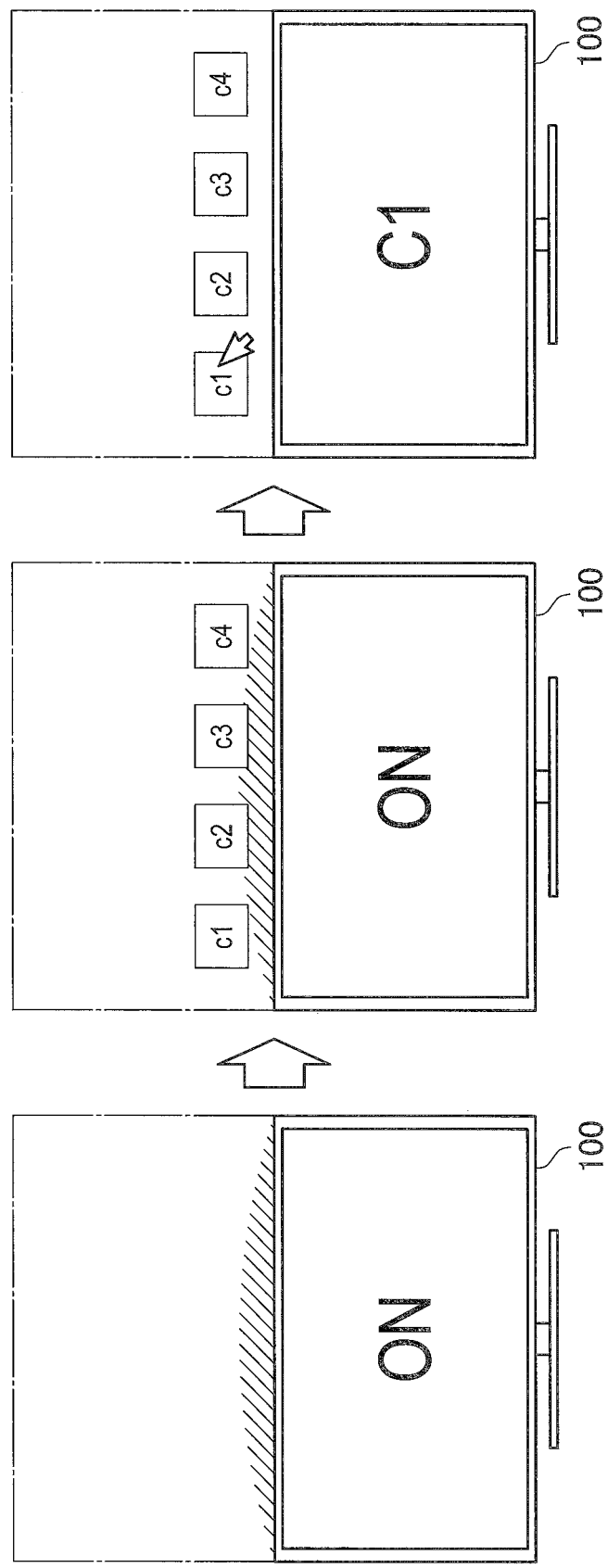
FIG. 18 is a diagram illustrating an example in which a display of a display unit is changed by an operation of a GUI projected by a projection unit of a display device in a third embodiment of the present disclosure.

The display device 110-3 projects a GUI, which performs the operation of the display unit 112, on the projection unit 114. Specifically, when the operation detection unit 106 detects the operation of projecting the GUI, the display control unit 110-3 acquires an image of the GUI from the storage unit 108 and projects the acquired image on the projection unit 114. More specifically, description will be provided with reference to FIG. 18. FIG. 18 is a diagram illustrating an example in which the display of the display unit 112 is changed by the operation of the GUI projected by the projection unit 114 of the display device 100 in the third embodiment of the present disclosure.

First, the display control unit 110-3 displays content on the display unit 112 and projects content on the projection unit 114.

Then, when it is determined by the operation detection unit 106 that the operation of projecting the GUI has been performed, the display control unit 110-3 gives an effect to a region of the projection image adjacent to the display unit 112. Since the processing of giving the effect is substantially the same as the processing of giving the effect according to the first embodiment, a detailed description thereof will be omitted. For example, the display control unit 110-3 gives an effect to the projection image as illustrated in the left diagram of FIG. 18.

Then, the display control unit 110-3 acquires GUIs to be projected on the projection unit 114 and projects the acquired GUIs on the projection unit 114. For example, as illustrated in the middle diagram of FIG. 18, the display control unit 110-3 acquires images c1 to c4 of the GUIs from the storage unit 108 and projects the acquired image on the projection unit 114. The effect given to the projection image is removed after the GUI is projected on the projection unit 114.

Then, when the user operation on the projected GUI is determined by the operation detection unit 106, the display control unit 110-3 switches the display of the display unit 112 to the GUI on which the operation has been performed. For example, as illustrated in the right diagram of FIG. 18, when the user performs the operation of selecting c1 from the projected GUIs, the operation detection unit 106 may detect the relevant operation and the display control unit 110-3 may switch the display of the display unit 112 to a video C1 corresponding to the GUI on which the operation has been performed.

[4-2. Processing of Display Device in Third Embodiment of the Present Disclosure]

Figure 19:
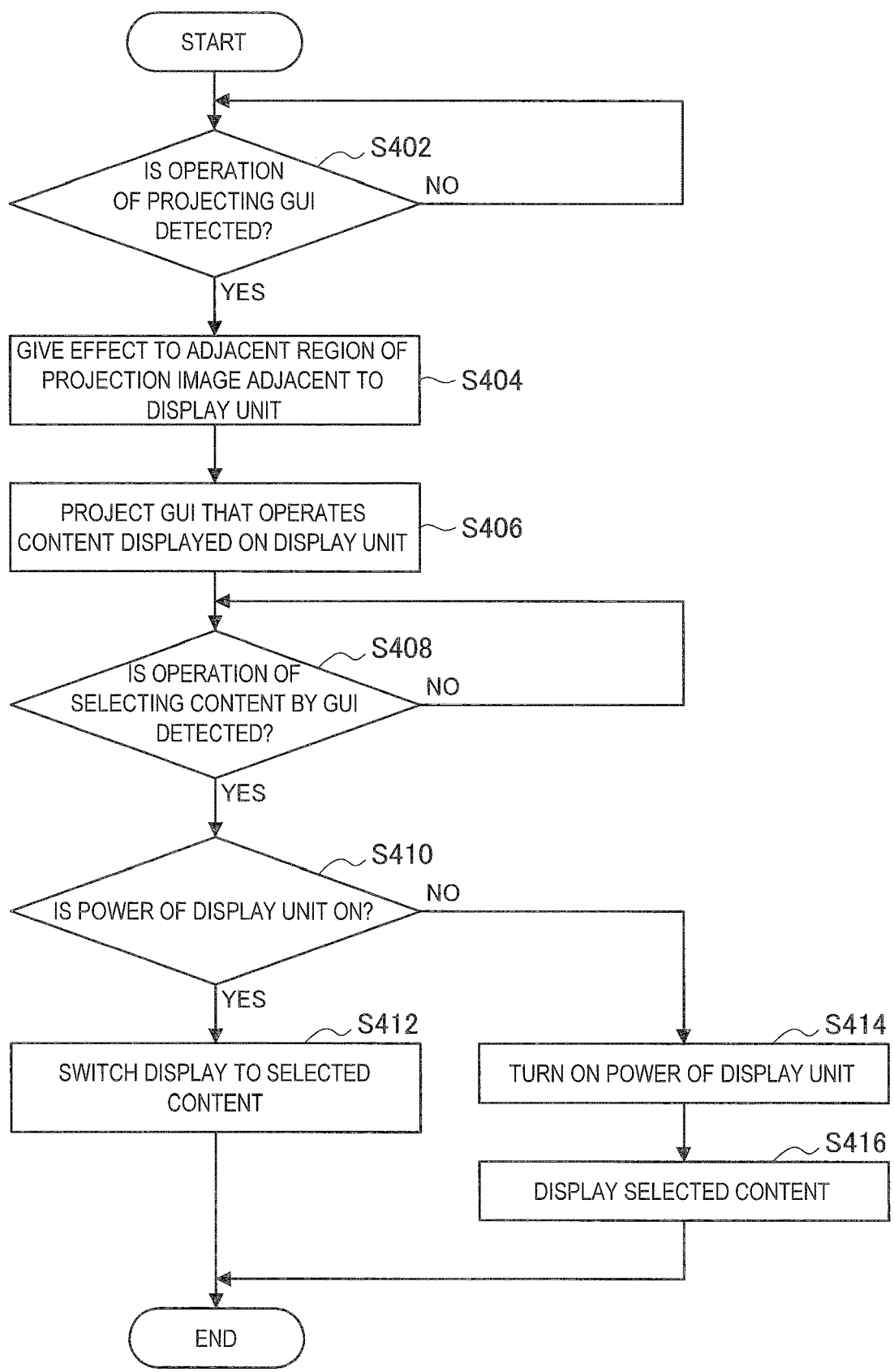
FIG. 19 is a flowchart conceptually illustrating processing of a display device in the third embodiment of the present disclosure.

Next, the processing of the display device 100 according to the third embodiment of the present disclosure will be described with reference to FIG. 19. FIG. 19 is a flowchart conceptually illustrating the processing of the display device 100 in the third embodiment of the present disclosure.

First, the display device 100 waits until the operation of projecting the GUI is detected (step S402). Since the processing of detecting the user operation is substantially the same as the processing of the first embodiment, a description thereof will be omitted.

In step S402, when the operation of projecting the GUI is detected, the display control unit 110-3 gives an effect to a region of the projection image adjacent to the display unit 112 (step S404). Since the processing of giving the effect is substantially the same as the processing of the first embodiment, a detailed description thereof will be omitted.

Subsequently, the display control unit 110-3 projects the GUI, which operates the content to be displayed on the display unit 112, on the projection unit 114 (step S406). Specifically, the display control unit 110-3 acquires an image of a GUI for operating the content to be displayed on the display unit 112, which is stored in the storage unit 108, and projects the acquired image on the projection unit 114.

Subsequently, the display device 100 waits until the operation of selecting the content by the GUI is detected (step S408). Since the processing of detecting the user operation is substantially the same as the processing of the first embodiment, a description thereof will be omitted.

In step S408, when the operation of selecting the content by the GUI is detected, the display control unit 110-3 determines whether the power of the display unit 112 is turned on (step S410).

In step S410, when it is determined that the power of the display unit 112 is turned on, the display control unit 110-3 switches the display to the selected content (step S412). Specifically, the display control unit 110-3 acquires the content associated with the GUI, on which the selecting operation has been performed, from the storage unit 108, and switches the display of the display unit 112 to the acquired content.

In step S410, when it is determined that the power of the display unit 112 is not turned on, the display control unit 110-3 turns on the power of the display unit 112 (step S414) and displays the selected content (step S416). Specifically, the display control unit 110-3 acquires the content associated with the GUI, on which the selecting operation has been performed, from the storage unit 108, and displays the acquired content on the display unit 112.

According to the third embodiment of the present disclosure, the display device 100 projects the GUI, which operates the display unit 112, on the projection unit 114. Therefore, since the GUI of the display unit 112 is projected on the projection screen, the visibility of the display unit 112 can be improved.

[4-3. Modification of Third Embodiment of the Present Disclosure]

So far, the third embodiment of the present disclosure has been described. Note that the present embodiment is not limited to the above example. In the following, first to third modifications of the present embodiment will be described.

(First Modification)

Figure 20:
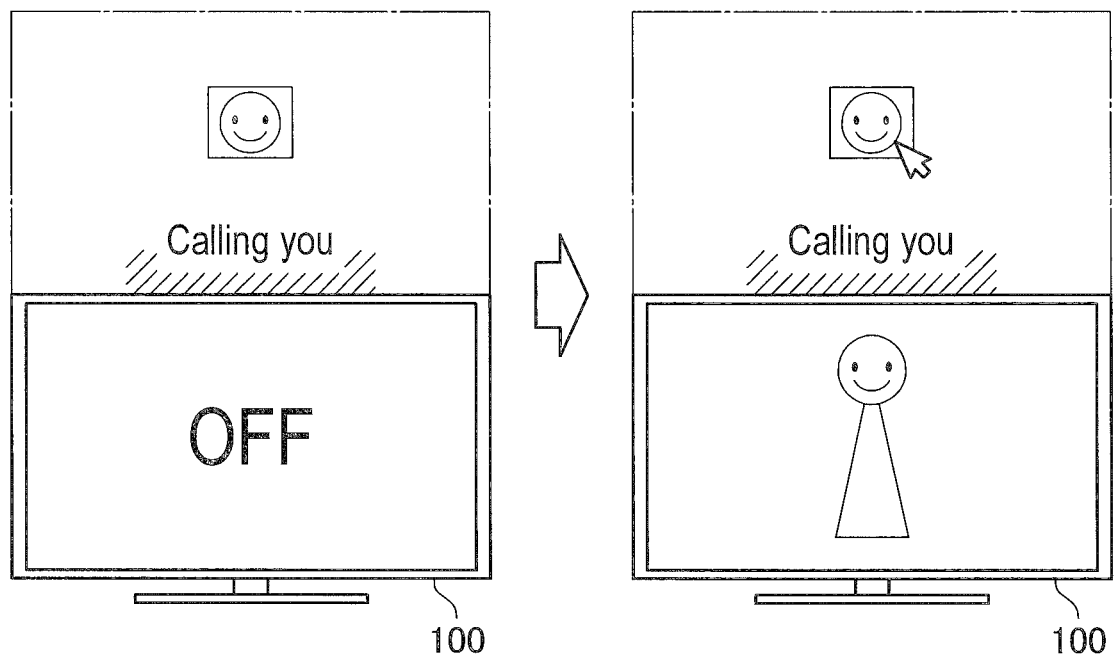
FIG. 20 is a diagram illustrating an example of projecting a GUI based on event information of a display device in a first modification of the third embodiment of the present disclosure.

As the first modification of the present embodiment, the display control unit 110-3 may project a GUI on the projection unit 114, based on generated event information. Specifically, the display device 100 further includes a communication unit 118 that performs communication with an external device of the display device 100, and the display control unit 110-3 projects a GUI on the projection unit 114, based on information acquired by the communication of the communication unit 118. More specifically, description will be provided with reference to FIG. 20. FIG. 20 is a diagram illustrating an example of projecting a GUI based on event information of the display device 100 in the first modification of the third embodiment of the present disclosure.

First, the display control unit 110-3 performs projection on the projection unit 114 in a state in which the power of the display unit 112 is turned off. For example, as illustrated in the left diagram of FIG. 20, the display control unit 110-3 may perform projection on the projection unit 114 in a state in which the power of the display unit 112 is turned off.

Then, when event information is generated, the display control unit 110-3 acquires a GUI to be projected on the projection unit 114 and projects the acquired GUI on the projection unit 114. For example, when the communication unit 118 receives chatting information from the external device through the network, the display control unit 110-3 acquires an image of the other person's face from the storage unit 108, based on the received chatting information, and projects an image notifying the presence of the acquired image and the incoming call on the projection unit 114.

Then, when the user operation is performed on the projected GUI, the display control unit 110-3 turns on the power of the display unit 112 and displays the content associated with the GUI, on which the operation has been performed, on the display unit 112. For example, as illustrated in the right diagram of FIG. 20, when the user performs the operation of selecting the image of the GUI projected by the projection unit 114, the operation detection unit 106 detects the relevant operation and the display control unit 110-3 may turn on the power of the display unit 112 and display a video including the received chatting information on the display unit 112.

In this way, the display device 100 projects the GUI on the projection unit 114, based on the information acquired by the communication of the communication unit 118. Since the GUI is automatically projected on the projection unit 114, based on the communication from the external device with respect to the display device 100, the user can be aware of communication without the user operation.

(Second Modification)

Figure 21:
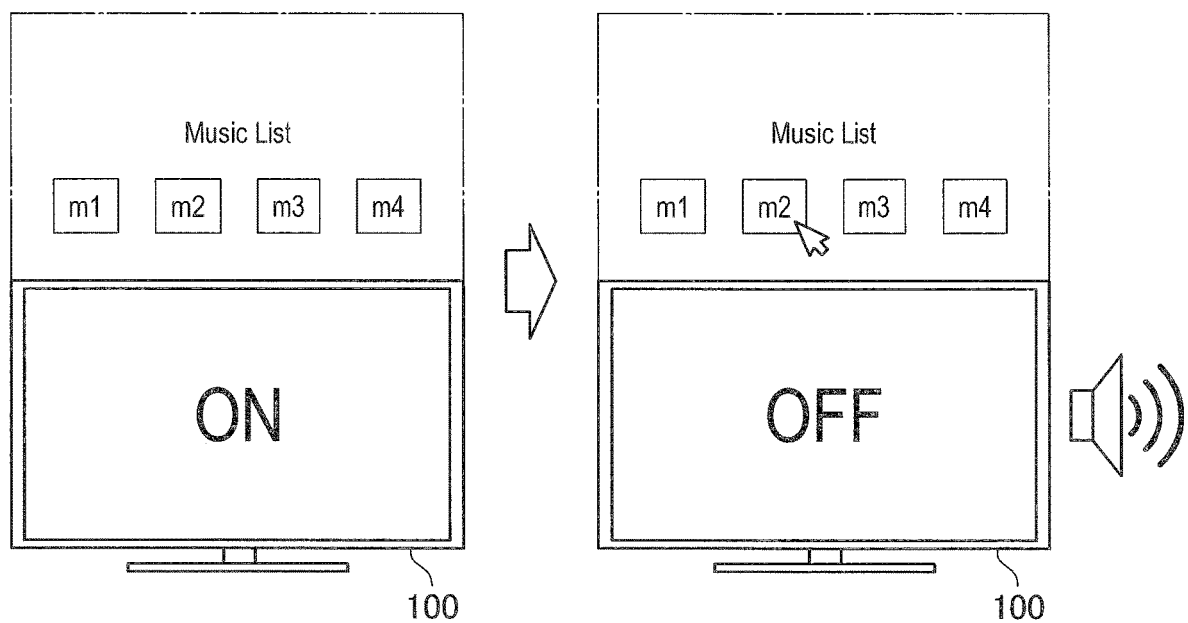
FIG. 21 is a diagram illustrating an example in which a display of a display unit is changed by an operation of a projected GUI of a display device in a second modification of the third embodiment of the present disclosure.

As the second modification of the present embodiment, the display device 100 erases the display of the display unit 112, while outputting the sound of the display unit 112, based on operation by the GUI projected on the projection unit 114. Specifically, the display device 100 further includes a sound output unit 120, the display control unit 110-3 erases the display of the display unit 112, based on the operation by the operation GUI, and the sound output unit 120 continues to output the sound. More specifically, description will be provided with reference to FIG. 21. FIG. 21 is a diagram illustrating an example in which the display of the display unit 112 is changed by the operation of the GUI projected by the display device 100 in the second modification of the third embodiment of the present disclosure.

First, the display control unit 110-3 displays content on the display unit 112 and projects content on the projection unit 114. Also, the sound output unit 120 outputs the sound of the content displayed on the display unit 112. For example, as illustrated in the left diagram of FIG. 21, the display control unit 110-3 may display content on the display unit 112 and project m1 to m4, which are GUIs operating music content, on the projection unit 114.

Then, when the user operation is performed on the projected GUI, the display control unit 110-3 turns on the power of the display unit 112 and the sound output unit 120 outputs the sound of the content corresponding to the GUI on which the operation has been performed. For example, as illustrated in the right diagram of FIG. 21, when the user performs the operation of selecting the projected m2, the operation detection unit 106 detects the relevant operation. Then, the display control unit 110-3 turns off the power of the display unit 112 and the sound output unit 120 outputs the sound of the music content corresponding to m2 on which the selecting operation has been performed.

In this way, the display device 100 detects the operation by the GUI projected on the projection unit 114, turns off the power of the display unit 112 based on the detected operation, and outputs the sound corresponding to the detected operation. Since the power of the display unit 112 is automatically turned off while outputting the sound, based on the user operation, the can save the power without performing the operation of turning off the power.

(Third Modification)

Figure 22A:
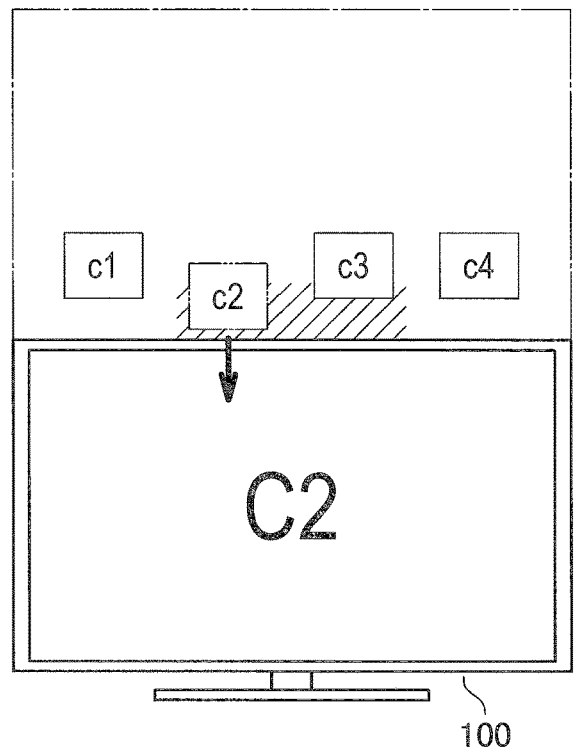
FIG. 22A is a diagram illustrating an example in which a display of a display unit is changed by an operation of a projected GUI of a display device in a third modification of the third embodiment of the present disclosure.
Figure 22B:
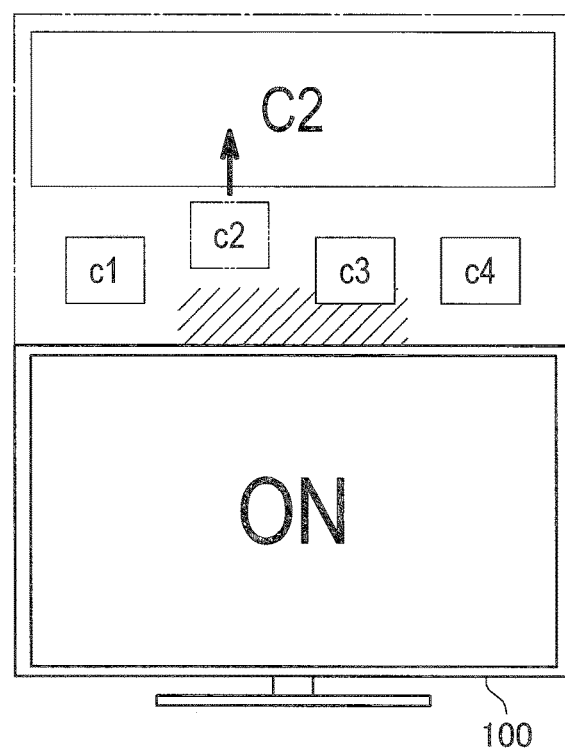
FIG. 22B is a diagram illustrating an example in which a projection image of a display unit is changed by an operation of a projected GUI of a display device in the third modification of the third embodiment of the present disclosure.

As the third modification of the present embodiment, when the GUI projected on the projection unit 114 is erased while shifting toward the display unit 112, the display control unit 110-3 may switch the display of the display unit 112 to the content associated with the erased GUI. Also, when the GUI projected on the projection unit 114 is erased while shifting in a direction opposite to the direction toward the display unit 112, the display control unit 110-3 may project the content associated with the erased GUI on the projection unit 114. Specifically, description will be provided with reference to FIGS. 22A and 22B. FIG. 22A is a diagram illustrating an example in which the display of the display unit 112 is changed by the operation of the GUI projected by the display device 100 in the third modification of the third embodiment of the present disclosure. FIG. 22B is a diagram illustrating an example in which the projection image of the projection unit 114 is changed by the operation of the GUI projected by the display device 100 in the third modification of the third embodiment of the present disclosure.

Then, when the user operation of displaying the GUI is performed, the display control unit 110-3 gives an effect to a region of the projection image of the projection unit 114, which is adjacent to the display unit 112, and projects a GUI that operates the display of the display unit 112. For example, as illustrated in FIGS. 22A and 22B, the display control unit 110-3 may give an effect to an adjacent region of each of the projection image and the display image, and project c1 to c4, which are GUIs operating the display of the display unit 112, on the projection unit 114.

Then, when the user performs the operation of shifting the GUI projected on the projection unit 114 in a direction toward the display unit 112, the operation detection unit 106 detects the relevant operation. Then, the display control unit 110-3 erases the GUI from the projection image by shifting the GUI in a direction toward the display unit 112, based on the detection result of the operation detection unit 106. For example, as illustrated in FIG. 22A, when the user performs the operation of shifting c2 toward the display unit 112, the operation detection unit 106 may detect the relevant operation and the display control unit 110-3 may shift c2 toward the display unit 112 and erase c2 from the projection image.

Then, the display control unit 110-3 switches the display of the display unit 112 to the content associated with the GUI erased from the projection image. For example, as illustrated in FIG. 22A, the display control unit 110-3 may switch the display of the display unit 112 to a video C2 associated with c2 erased from the projection image.

Also, when the user performs the operation of shifting the GUI projected on the projection unit 114 in a direction opposite to the direction toward the display unit 112, the operation detection unit 106 detects the relevant operation. Then, the display control unit 110-3 shifts the GUI on the projection image in a direction opposite to the direction toward the display unit 112 and erases the GUI from the projection image, based on the detection result of the operation detection unit 106. For example, as illustrated in FIG. 22B, when the user performs the operation of shifting c2 toward the upper portion of the projection image, the operation detection unit 106 may detects the relevant operation and the display control unit 110-3 may shift c2 toward the upper portion of the projection image and erases c2 from the projection image.

Then, the display control unit 110-3 projects the content associated with the GUI erased from the projection image in the upper portion of the projection image. For example, the display control unit 110-3 may project the video C2 associated with c2 erased from the projection image in the upper portion of the projection image.

In this way, the display control unit 110-3 displays the content associated with the GUI on the projection image, which has been erased by shifting in a direction toward the display unit 112, on the display unit 112, and projects the content associated with the GUI on the projection screen, which has been erased by shifting in a direction opposite to the direction toward the display unit 112, on the projection unit 114. Since the content is played back on the screen according to the direction of the user operation, the user can designate a content playback screen by an intuitive operation.

5. Fourth Embodiment of the Present Disclosure

[5-1. Configuration of Display Device According to Fourth Embodiment of the Present Disclosure]

Next, a configuration of a display device 100 according to a fourth embodiment of the present disclosure will be described. A description about a configuration substantially identical to the configuration of the display device 100 according to the first to third embodiments will be omitted. A display control unit 110-4 is a display control unit 110 according to the fourth embodiment of the present disclosure.

Figure 23:
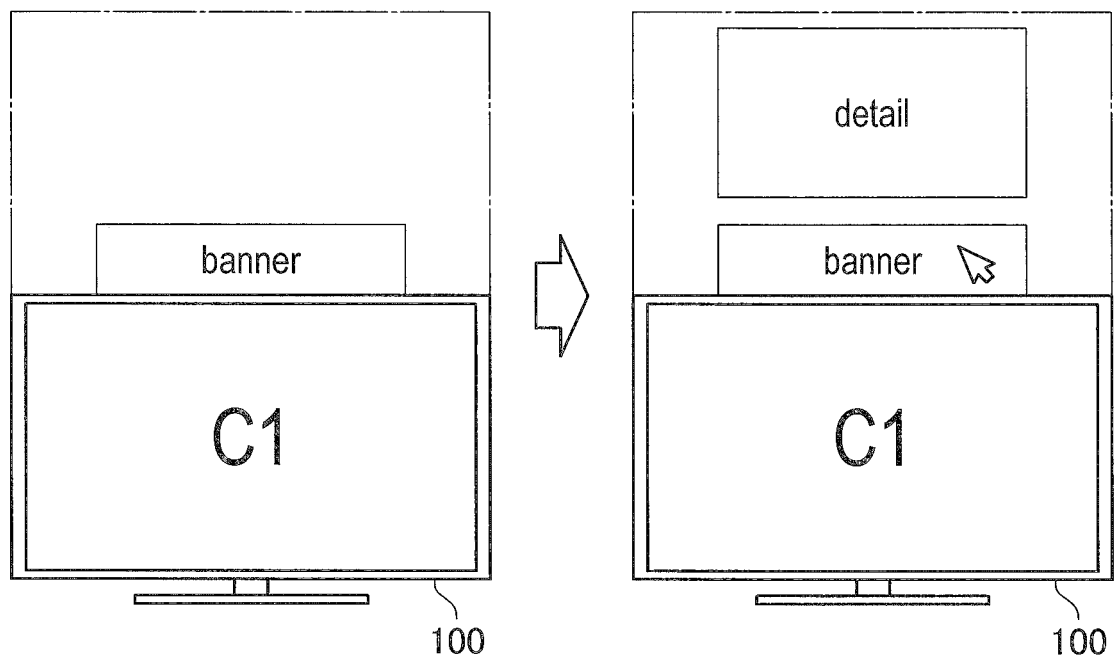
FIG. 23 is a diagram illustrating an example in which a projection image is changed based on content meta information of a display device in a fourth embodiment of the present disclosure.

The display control unit 110-4 changes the projection image of the projection unit 114 based on information on the content to be displayed on the display unit 112. Specifically, the display control unit 110-4 changes the projection image based on meta information of the content to be displayed on the display unit 112. For example, the display control unit 110-4 acquires meta information of the content to be displayed on the display unit 112 and acquires information to be projected on the projection unit 114 from a storage location of the information indicated in the meta information. The display control unit 110-4 changes the projection image based on the acquired information. Furthermore, details will be described with reference to FIG. 23. FIG. 23 is a diagram illustrating an example in which the projection image is changed based on content meta information of the display device 100 in the fourth embodiment of the present disclosure.

The display control unit 110-4 projects, on the projection unit 114, the image generated based on the meta information of the content displayed on the display unit 112. For example, as illustrated in the left diagram of FIG. 23, the display control unit 110-4 may generate a banner image based on a title of content included in the meta information of a video C1 to be displayed on the display unit 112, and project the generated banner image on the projection unit 114.

Then, when the user performs the operation of selecting the projected image, the operation detection unit 106 detects the relevant operation. Based on the detection result of the operation detection unit 106, the display control unit 110-4 accesses a storage location of the information indicated by the meta information associated with the image on which the selecting operation has been performed and acquires information of content associated with the meta information. The display control unit 110-4 projects the information of the acquired content on the projection unit 114. For example, as illustrated in the right diagram of FIG. 23, when the user performs the operation of selecting a projected banner image, the operation detection unit 106 may detect the relevant operation. Based on the detection result of the operation detection unit 106, the display control unit 110-4 may acquire detailed content information from a location indicated by a URL included in the meta information associated with the generation of the banner image, and project the acquired detailed content information on the banner image.

Figure 24:
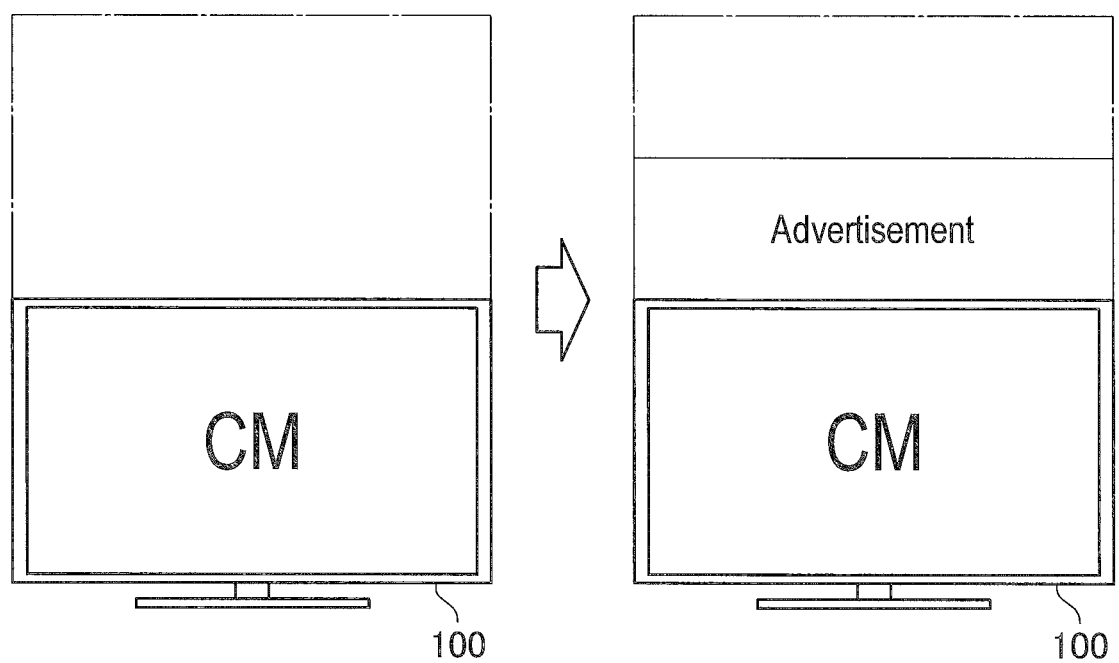
FIG. 24 is a diagram illustrating another example in which a projection image is changed based on content meta information of a display device in the fourth embodiment of the present disclosure.

The display control unit 110-4 may project, on the projection unit 114, web content indicated by the URL included in the meta information of the content to be displayed on the display unit 112. Specifically, description will be provided with reference to FIG. 24. FIG. 24 is a diagram illustrating another example in which the projection image is changed based on content meta information of the display device 100 in the fourth embodiment of the present disclosure. The display control unit 110-4 displays content on the display unit 112. For example, as illustrated in the left diagram of FIG. 24, the display control unit 110-4 may display a commercial video on the display unit 112.

Then, the display control unit 110-4 projects, on the projection unit 114, web content indicated by the URL included in the meta information of the content to be displayed on the display unit 112. For example, as illustrated in the right diagram of FIG. 24, the display control unit 110-4 may acquire an advertisement video on a web indicated by a URL included in the meta information associated with the commercial video to be displayed on the display unit 112. The display control unit 110-4 may project the acquired advertisement video on the projection unit 114.

[5-2. Processing of Display Device in Fourth Embodiment of the Present Disclosure]

Figure 25:
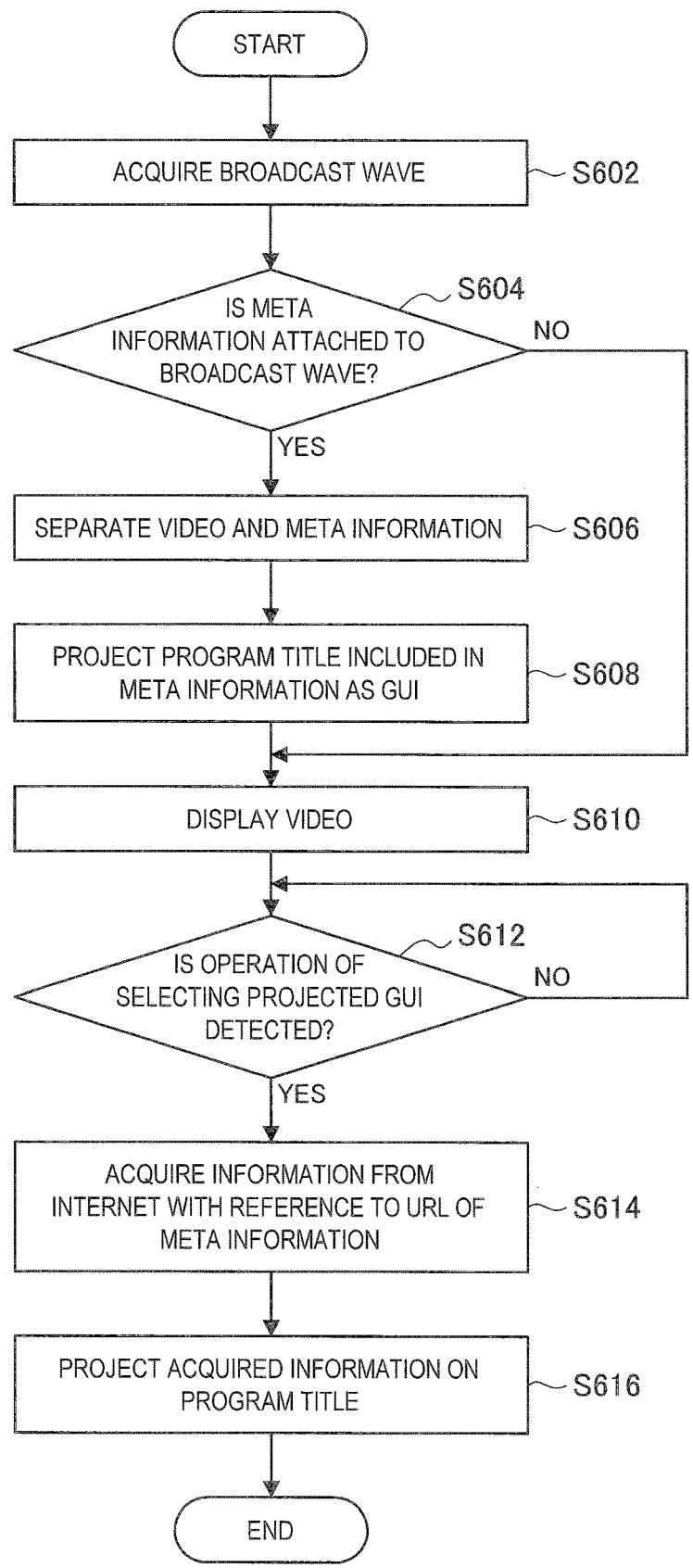
FIG. 25 is a flowchart conceptually illustrating processing of a display device in the fourth embodiment of the present disclosure.

Next, the processing of the display device 100 according to the fourth embodiment of the present disclosure will be described with reference to FIG. 25. FIG. 25 is a flowchart conceptually illustrating the processing of the display device 100 in the fourth embodiment of the present disclosure.

First, the display control unit 110-4 acquires a broadcast wave (step S602). For example, the display control unit 110-4 may acquire a terrestrial digital broadcasting or the like through a reception antenna or a network.

Subsequently, the display control unit 110-4 determines whether meta information is attached to the broadcast wave (step S604).

In step S604, when it is determined that the meta information is attached to the broadcast wave, the display control unit 110-4 separates the video and the meta information (step S606).

Subsequently, the display control unit 110-4 projects a program title included in the meta information as a GUI (step S608). Specifically, the program title associated with the video is acquired from the separated meta information, and the GUI is generated based on the acquired program title and is projected on the projection unit 114.

In step S604, when it is determined that the meta information is not attached to the broadcast wave, the processing proceeds to step S610.

Subsequently, the display control unit 110-4 displays a video (step S610). Specifically, the display control unit 110-4 displays the video of the acquired broadcast wave on the display unit 112.

Subsequently, the display device 100 waits until an operation of selecting the projected GUI is detected by the operation detection unit 106 (step S612). Since the processing of detecting the user operation is substantially the same as the processing of the first embodiment, a description thereof will be omitted.

In step S612, when the operation of selecting the projected GUI is detected, the display control unit 110-4 acquires information from the Internet with reference to the URL of the meta information (step S614). Specifically, the display control unit 110-4 accesses a location where the information on the content indicated by the URL of the content meta information through the Internet and acquires the information on the content.

Subsequently, the display control unit 110-4 projects the acquired information on the program title (step S616).

As such, according to the fourth embodiment of the present disclosure, the display device 100 changes the projection image based on the meta information of the content displayed on the display unit 112. Since the information on the content of the display screen is projected on the projection screen, the information on the display content can be provided without degrading the visibility of the display content.

[5-3. Modification of Fourth Embodiment of the Present Disclosure]

So far, the fourth embodiment of the present disclosure has been described. Note that the present embodiment is not limited to the above example. In the following, first to second modifications of the present embodiment will be described.

(First Modification)

Figure 26:
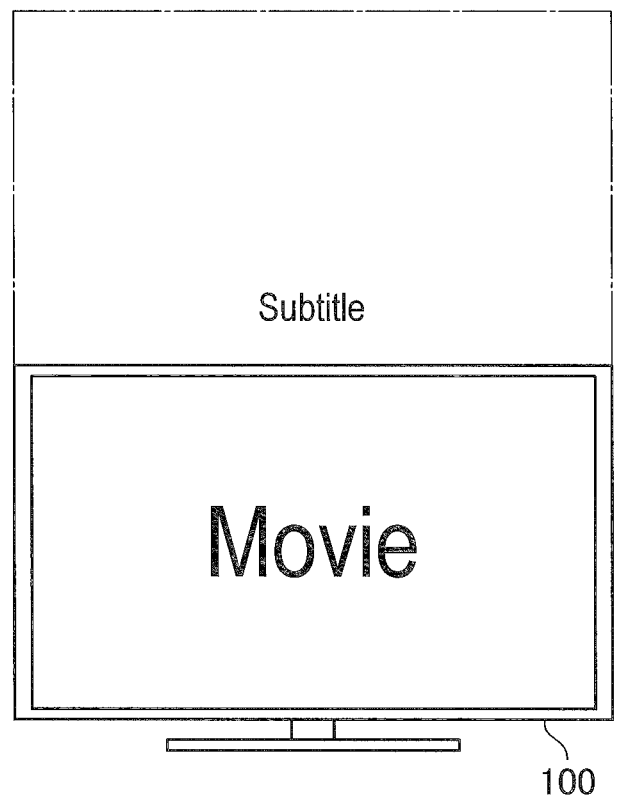
FIG. 26 is a diagram illustrating an example in which a projection image is changed based on accompanying information of content of a display device in a first modification of the fourth embodiment of the present disclosure.

As the first modification of the present embodiment, the display control unit 110-4 may change the projection image based on accompanying information of the content to be displayed on the display unit 112. Specifically, description will be provided with reference to FIG. 26. FIG. 26 is a diagram illustrating an example in which the projection image is changed based on accompanying information of content of the display device 100 in the first modification of the fourth embodiment of the present disclosure.

First, the display control unit 110-4 acquires content to be displayed on the display unit 112 and accompanying information of the content. For example, the display control unit 110-4 may acquire a video of movie from a DVD or the like stored in a DVD drive or the like and acquire caption information of the relevant movie.

Then, the display control unit 110-4 displays the acquired content on the display unit 112 and changes the projection image based on the accompanying information of the content. For example, as illustrated in FIG. 26, the display control unit 110-4 may display the video of the acquired movie on the display unit 112 and projects a caption on the projection unit 114 according to a video playback time included in the caption information.

In this way, the display control unit 110-4 changes the projection image based on the accompanying information of the content to be displayed on the display unit 112. Since the change is projected based on the accompanying information associated with the content displayed on the display unit 112, the visibility of the content displayed on the display unit 112 can be improved.

(Second Modification)

Figure 27A:
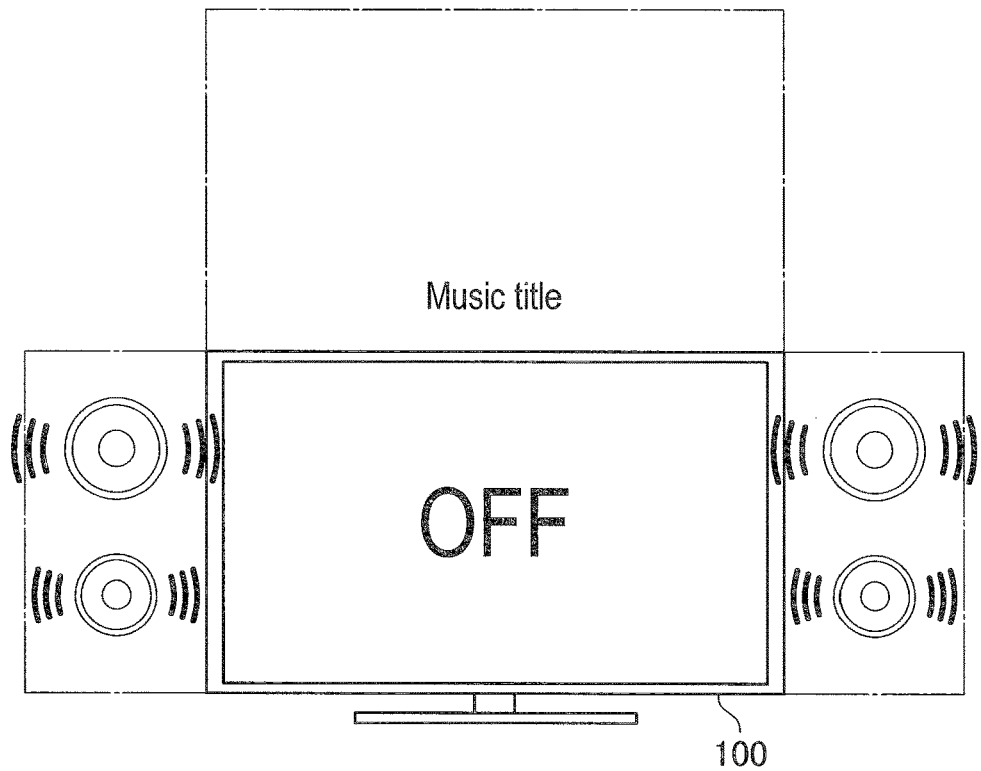
FIG. 27A is a diagram illustrating an example in which a projection image is changed according to a sound output of a display device in a second modification of the fourth embodiment of the present disclosure.
Figure 27B:
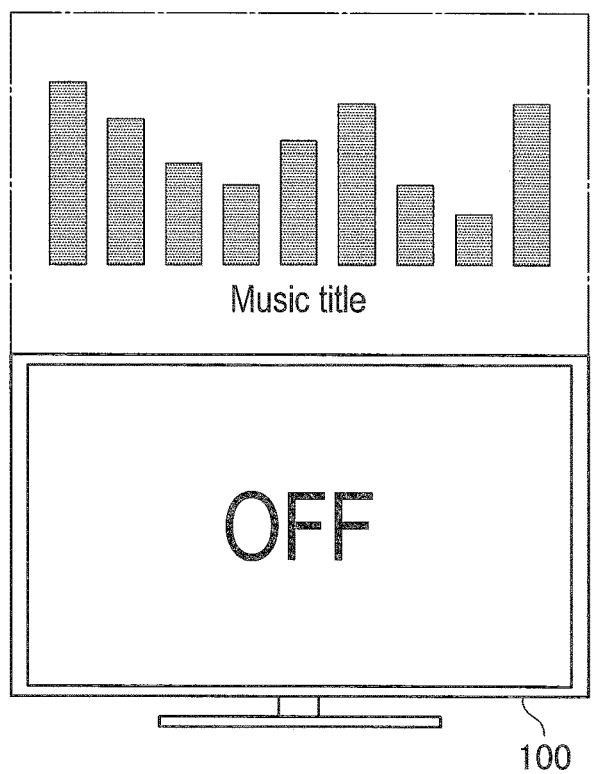
FIG. 27B is a diagram illustrating another example in which a projection image is changed according to a sound output of a display device in the second modification of the fourth embodiment of the present disclosure.

As the second embodiment of the present embodiment, the display control unit 110-4 may change the projection image according to sound output. Specifically, the display device 100 includes a sound output unit 120, and the display control unit 110-4 changes the projection image according to the sound output by the sound output unit 120. More specifically, description will be provided with reference to FIGS. 27A and 27B. FIG. 27A is a diagram illustrating an example in which the projection image is changed according to the sound output of the display device 100 in the second modification of the fourth embodiment of the present disclosure. FIG. 27B is a diagram illustrating another example in which the projection image is changed according to the sound output of the display device 100 in the second modification of the fourth embodiment of the present disclosure.

First, the display control unit 110-4 acquires text information associated with the sound output by the sound output unit 120, and projects the text information at the upper rear side of the display surface of the display unit 112. For example, as illustrated in FIG. 27A, the display control unit 110-4 may acquire a title of a music to be output by the sound output unit 120 from the storage unit 108 and project a text of the acquired title of the music at the upper rear side of the display surface of the display unit 112.

Then, the display control unit 110-4 acquires the image evoking a device to perform the sound output from the storage unit 108 or the like, projects the acquired image on the left rear side and the right rear side of the display surface of the display unit 112, and moves an image to be projected while interworking with the sound output by the sound output unit 120. For example, as illustrated in FIG. 27A, the display control unit 110-4 may project speaker images on the left rear side and the right rear side of the display surface of the display unit 112, and slightly move the positions of the speaker images according to the rhythm of the music, of which the sound output is performed by the sound output unit 120. Also, the display device 100 further includes a conversion unit 122 that generates a video from the sound output, and the display control unit 110-4 may project the video generated by the conversion unit 122 on the projection unit 114.

First, the display control unit 110-4 acquires text information associated with the sound output by the sound output unit 120, and projects the text information at the upper rear side of the display surface of the display unit 112. For example, as illustrated in FIG. 27B, the display control unit 110-4 may acquire a title of a music to be output by the sound output unit 120 from the storage unit 108 and project a text of the acquired title of the music at the upper rear side of the display surface of the display unit 112.

Then, the conversion unit 122 receives the output of the sound output unit 120 and generates a video. The display control unit 110-4 acquires the video generated by the conversion unit 122 and projects the acquired video on the text information. For example, as illustrated in FIG. 27B, the conversion unit 122 may generate an output video, such as a spectrum analyzer, based on sound data output by the sound output unit 120. The display control unit 110-4 may project the output video generated by the conversion unit 122 on the music title of the projection unit 114. In the conversion unit 122, existing software or the like may be used.

In this way, the display control unit 110-4 changes the projection image according to the sound output by the sound output unit 120. Since the projection image is changed while interworking with the sound, the user can use the display device 100 as an audio device.

6. Hardware Configuration According to Embodiment of the Present Disclosure

So far, the embodiments of the present disclosure have been described. The processing of the above-described display device 100 is realized by cooperation of software and hardware of the above-described display device 100.

Figure 28:
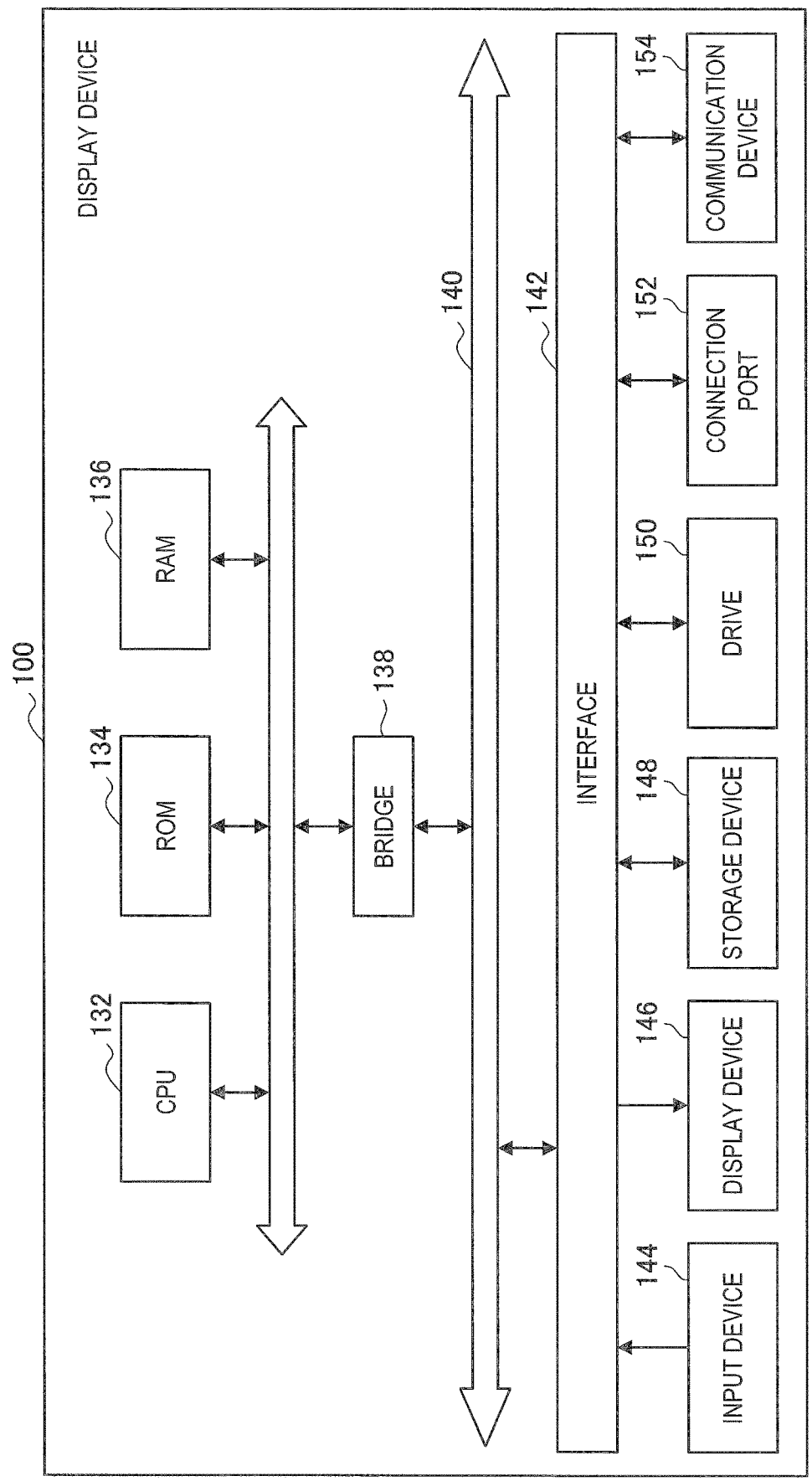
FIG. 28 is an explanatory diagram illustrating a hardware configuration of a display device 100 according to an embodiment of the present disclosure.

FIG. 28 is an explanatory diagram illustrating a hardware configuration of the display device 100 according to an embodiment of the present disclosure. As illustrated in FIG. 28, the display device 100 include a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing unit and a controller, and realizes the operations of the operation detection unit 106, the display control unit 110, the determination unit 116, and the conversion unit 122 of the display device 100 in cooperation with various programs. Also, the CPU 132 may be a microprocessor. The ROM 134 stores programs or arithmetic parameters, and the like which are used by the CPU 132. The RAM 136 temporarily stores programs which are used in the execution of the CPU 132, or parameters which are appropriately changed upon execution. A part of the storage unit 108 in the display device 100 is realized by the ROM 134 and the RAM 136. The CPU 132, the ROM 134, and the RAM 136 are mutually connected through an internal bus configured by a CPU bus or the like.

The input device 144 includes an input unit configured to allow a user to input information, such as a mouse, a keyboard, a touch panel, a button, a microphone, a switch, and a lever, and an input control circuit configured to generate an input signal based on a user input and an image acquired by the imaging unit 104 provided in the display device 100, and output the input signal to the CPU 132. The user of the display device 100 can input various data or instruct the processing operations to the display device 100 by operating the input device 144.

The output device 146 is an example of the display unit 112 and the projection unit 114 of the display device 100 according to the present embodiment, and performs output to a device, for example, a liquid crystal display (LCD) device, an organic light emitting diode (OLED) device, a projector, and a lamp. Furthermore, the output device 146 is an example of the sound output unit 120 according to the present embodiment, and performs the sound output of a speaker, a headphone or the like.

The storage device 148 is a device for data storage configured as an example of the storage unit 108 of the display device 100 according to the present embodiment. The storage device 148 may include a storage medium, a recording device that records data in the storage medium, a reading device that reads data from the storage medium, and an erasing device that erases data recorded on the storage medium. The storage device 148 stores programs or various data which are executed by the CPU 132.

The drive 150 is a reader/writer for storage medium and is internally or externally mounted in the display device 100. The drive 150 reads information recorded in a removable storage medium, such as a magnetic disk, an optical disk, a magneto-optical disk, or a semiconductor memory mounted thereon, and outputs the read information to the RAM 134. Also, the drive 150 may write information to the removable storage medium.

The connection port 152 is a bus for connection to, for example, the external information processing devices or peripheral devices of the display device 100. Also, the connection port 152 may be a universal serial bus (USB).

The communication device 154 is an example of the reception unit 102 and the communication unit 118 of the display device 100 according to the present embodiment and is a communication interface for connection to, for example, the network. Also, the communication device 154 may also be a device compatible with infrared communication, a communication device compatible with wireless local area network (LAN), a communication device compatible with long term evolution (LTE), or a wired communication device that performs communication by wire.

7. Conclusion

According to the first embodiment of the present disclosure, by changing the display of the adjacent region of each of the projection image and the display image, the user can intuitively understand that the portion of the erased projection image causes the change in the display of the display unit 112. Also, according to the second embodiment of the present disclosure, by displaying the associated contents at the adjacent portion, the user can intuitively understand that the adjacent contents are associated with each other. Also, according to the third embodiment of the present disclosure, since the GUI of the display unit 112 is projected on the projection screen, the visibility of the display unit 112 can be improved. Also, according to the fourth embodiment of the present disclosure, since the information on the content of the display screen is projected on the projection screen, the information on the display content can be provided without degrading the visibility of the display content.

The preferred embodiments of the present disclosure have been described in detail with reference to the appended drawings, but the technical scope of the present disclosure is not limited to such examples. It should be understood by those skilled in the art that various modifications, combinations, sub-combinations and alterations may occur depending on design requirements and other factors insofar as they are within the scope of the appended claims or the equivalents thereof.

Also, hardware embedded in the display device 100 according to the embodiment of the present disclosure can be implemented by a computer program for exhibiting the same functions as each configuration of the display device 100 according to the above-described embodiment. Also, a recording medium having stored therein the computer program is provided.

Also, steps illustrated in the flowcharts of the embodiments include processing that is performed in time series in the described order and processing that is performed in parallel or individually even though not necessarily performed in time series. Also, it is obvious that even the steps that are performed in time series, if necessary, can be changed in appropriate order.

Also, the effects described herein are only for illustrative or explanatory purposes, not limiting purposes. That is, it is apparent to those skilled in the art that other effects can be provided from the description of the present disclosure, in addition to or alternative to the above effects.

Additionally, the present technology may also be configured as below.

(1) A display device including:
a display unit; and
a projection unit provided in a direction intersecting with a direction perpendicular to a display surface of the display unit, with a rear side of the display surface as a projection direction.

(2) The display device according to (1),
wherein the display device is used as a stationary display device.

(3) The display device according to (1) or (2), further including:
a display control unit configured to change a display image of the display unit and a projection image of the projection unit so as to interwork with each other.

(4) The display device according to (3),
wherein, when at least a portion of the projection image is erased while shifting in a direction toward the display unit, the display control unit changes a display of at least a portion of an adjacent region of each of the display image and the projection image, such that the display image is switched to an image associated with at least the erased portion of the projection image.

(5) The display device according to (3) or (4),
wherein, when at least a portion of the projection image is partially erased while shifting in a direction toward the display unit, the display control unit switches the display image to an image associated with at least a portion of the projection image.

(6) The display device according to (3),
wherein the display image is content displayed by the display unit, and
wherein, when the content displayed on the display unit is switched, the display control unit changes the projection image such that a portion of the projection image pops out in an opposite direction to a direction toward the display unit.

(7) The display device according to (3),
wherein the display image and the projection image are each content, and
wherein the display control unit shifts content displayed on the display unit to a projection screen of the projection unit and shifts content projected by the projection unit to a display screen of the display unit.

(8) The display device according to (1) or (2), further including:
a display control unit configured to give a projection image of the projection unit a display effect that evokes integration of the projection image and the display unit.

(9) The display device according to (8),
wherein the display control unit generates the projection image such that an image associated with display content of the display unit is adjacent to the display unit.

(10) The display device according to (8),
wherein the display control unit generates the projection image such that a text associated with display content of the display unit is superimposed on an image evoking a conversation.

(11) The display device according to (8), further including:
a determination unit configured to determine a viewing situation of a user with respect to the display unit,
wherein, when it is determined by the determination unit that the user is in the viewing situation with respect to the display unit, the display control unit projects the projection image in which a trapezoidal distortion is given to the projection image such that a bottom close to the display unit is relatively shorter than the other bottom.

(12) The display device according to (8),
wherein the display control unit projects a portion of the projection image on the projection unit while shifting the portion of the projection image vertically or horizontally.

(13) The display device according to (1) or (2), further including:
a display control unit configured to project a GUI of the display unit on the projection unit.

(14) The display device according to (13),
wherein the display control unit projects the GUI on the projection unit, based on generated event information.

(15) The display device according to (13), further including:
a sound output unit, wherein, when the display control unit erases a display of the display unit based on an operation by the GUI, the sound output unit continues a sound output, and wherein the projection unit projects an image that is changed according to the sound output.

(16) The display device according to (1) or (2), further including:

a display control unit configured to change a projection image of the projection unit, based on information associated with display content of the display unit.

(17) The display device according to (16), wherein the display control unit changes the projection image, based on meta information of content to be displayed on the display unit.

(18) The display device according to (16), wherein the display control unit changes the projection image, based on accompanying information of content to be displayed on the display unit.

(19) A display method including:

displaying an image; and projecting an image in a direction intersecting with a direction perpendicular to a display surface of the image on a rear side of the display surface.

(20) A program for causing a computer to execute the processing of:

displaying an image; and projecting an image in a direction intersecting with a direction perpendicular to a display surface of the image on a rear side of the display surface.

What is claimed is:

1. A display device, comprising:
   a display screen;
   a projector on a rear surface of the display screen, wherein the projector is in a first direction intersecting with a second direction perpendicular to a display surface of the display screen; and
   a central processing unit (CPU) configured to:
     acquire content reservation information of first content, wherein
       the content reservation information indicates a start time of the first content and a URL associated with the first content, and
       the URL indicates a storage location of a text associated with the content reservation information;
     determine a current time is prior to the start time of the first content;
     add a first display effect on a projection screen based on a turned-off state of the display screen and the determination the current time is prior to the start time of the first content;
     control, based on the turned-off state of the display screen and the determination the current time is prior to the start time of the first content, the projector to project the text associated with the content reservation information on the projection screen, wherein
       the projection of the text is in a plane parallel to a display surface of the display screen, and
       the projection screen is on a rear side of the display surface of the display screen;
     determine the current time is equal to the start time of the first content;
     turn on power of the display screen based on the determination the current time is equal to the start time of the first content; and
     control, based on the determination the current time is equal to the start time of the first content, the display screen to display the first content.

2. The display device according to claim 1, wherein the display device is a stationary display device.

3. The display device according to claim 1, wherein the CPU is further configured to change the first content on the display screen of the display device based on a projection of second content on the projection screen.

4. The display device according to claim 1, wherein the CPU is further configured to:
   control the projector to project second content on the projection screen;
   shift display of the second content from the projection screen to the display screen; and
   add a second display effect to each of the display screen and the projection screen based on the shift.

5. The display device according to claim 1, wherein the CPU is further configured to:
   control the projector to project second content on the projection screen;
   shift display of the second content from the projection screen to the display screen; and
   control, based on the shift, the display screen to switch from the display of the first content to the display of the second content.

6. The display device according to claim 1, wherein the first content comprises a first image, and the CPU is further configured to:
   control the projector to project second content on the projection screen, wherein the second content comprises a second image; and
   add a second display effect on the projection screen, wherein the second display effect evokes an integration of the second image with the first image.

7. The display device according to claim 6, wherein the CPU is further configured to:
   determine a user's viewing situation with respect to the display screen;
   add a trapezoidal distortion to the second image based on the user's viewing situation; and
   control the projector to project the second image with the trapezoidal distortion, such that a first side of the second image is shorter than a second side of the second image, wherein the first side of the second image is closer to the display screen than the second side of the second image.

8. The display device according to claim 1, wherein the CPU is further configured to control the projector to project second content adjacent to the display screen, and
   the projection of the second content is based on a determination that the first content is associated with the second content.

9. The display device according to claim 1, wherein the CPU is further configured to:
   generate a first image based on text data associated with the first content; and
   control the projector to project the first image such that the text data is superimposed on a second image to initiate a conversation.

10. The display device according to claim 1, wherein the CPU is further configured to:
    control the projector to project second content on the projection screen; and
    control the projector to periodically shift the second content, on the projection screen, in one of a third direction towards the display screen or a fourth direction opposite to the third direction.

11. The display device according to claim 1, wherein the CPU is further configured to control the projector to project a GUI, of the display screen, on the projection screen.

12. The display device according to claim 11, wherein the CPU is further configured to control, based on event information of the display device, the projector to project the GUI.

13. The display device according to claim 11, further comprising:
a speaker configured to output a sound based on a user operation on the GUI, wherein
the CPU is further configured to:
control the projector to project second content on the projection screen;
turn-off the display screen based on the user operation; and
change the second content based on the sound.

14. The display device according to claim 1, wherein the CPU is further configured to:
control the projector to project second content on the projection screen; and
change the second content of the projection screen based on information associated with the first content of the display screen.

15. The display device according to claim 1, wherein the CPU is further configured to:
control the projector to project an upper half of a vertically long image of second content on the projection screen; and
control the display screen to display a lower half of the vertically long image.

16. The display device according to claim 1, wherein the URL further indicates an advertisement on a website, and
the CPU is further configured to acquire, as second content, the advertisement on the website.

17. The display device according to claim 1, wherein the CPU is further configured to:
control the projector to project an image of the first content on the projection screen; and
change at least one of a transparency or a degree of blur of the projected first image based on a movement of the projected image on the projection screen.

18. A display method, comprising:
in a display device that includes a display screen and a projector:
acquiring content reservation information of specific content, wherein
the content reservation information indicates a start time of the specific content and a URL associated with the specific content, and
the URL indicates a storage location of a text associated with the content reservation information;
determining a current time is prior to the start time of the specific content;
adding a first display effect on a projection screen based on a turned-off state of the display screen and the determination the current time is prior to the start time of the specific content;
controlling, based on the turned-off state of the display screen and the determination the current time is prior to the start time of the specific content, the projector to project the text associated with the content reservation information on the projection screen, wherein
the projection of the text is in a plane parallel to a display surface of the display screen,
the projector is in a first direction intersecting with a second direction perpendicular to the display surface of the display screen, and
the projection screen is on a rear side of the display surface of the display screen;
determining the current time is equal to the start time of the specific content;
turning on power of the display screen based on the determination the current time is equal to the start time of the specific content; and
controlling, based on the determination the current time is equal to the start time of the specific content, the display screen to display the specific content.

19. A non-transitory computer-readable medium having stored thereon computer-executable instructions that, when executed by a processor of a display device, cause the processor to execute operations, the operations comprising:
acquiring content reservation information of specific content, wherein
the content reservation information indicates a start time of the specific content and a URL associated with the specific content, and
the URL indicates a storage location of a text associated with the content reservation information;
determining a current time is prior to the start time of the specific content;
adding a first display effect on a projection screen based on a turned-off state of a display screen of the display device and the determination the current time is prior to the start time of the specific content;
controlling, based on the turned-off state of the display screen and the determination the current time is prior to the start time of the specific content, a projector of the display device to project the text associated with the content reservation information on the projection screen, wherein
the projection of the text is in a plane parallel to a display surface of the display screen,
the projector is in a first direction intersecting with a second direction perpendicular to the display surface of the display screen, and
the projection screen is on a rear side of the display surface of the display screen;
determining the current time is equal to the start time of the specific content;
turning on power of the display screen based on the determination the current time is equal to the start time of the specific content; and
controlling, based on the determination the current time is equal to the start time of the specific content, the display screen to display the specific content.

* * * * *